(12) United States Patent
Kusumoto

(10) Patent No.: US 12,464,078 B2
(45) Date of Patent: Nov. 4, 2025

(54) PRINTED MATERIAL MANAGEMENT SYSTEM INCLUDING SYSTEM AND METHOD FOR CONTROLLING A SHREDDER

(71) Applicant: BROTHER KOGYO KABUSHIKI KAISHA, Nagoya (JP)

(72) Inventor: Naoki Kusumoto, Toyohashi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 351 days.

(21) Appl. No.: 18/167,073

(22) Filed: Feb. 10, 2023

(65) Prior Publication Data

US 2023/0249192 A1    Aug. 10, 2023

(30) Foreign Application Priority Data

Feb. 10, 2022    (JP) ................................. 2022-019492

(51) Int. Cl.
*H04N 1/00* (2006.01)
*B02C 18/00* (2006.01)
(Continued)

(52) U.S. Cl.
CPC ..... *H04N 1/00334* (2013.01); *B02C 18/0007* (2013.01); *B02C 25/00* (2013.01); *H04N 1/32122* (2013.01); *H04N 1/32133* (2013.01); *H04N 1/4473* (2013.01); *H04N 2201/3202* (2013.01); *H04N 2201/3269* (2013.01)

(58) Field of Classification Search
CPC ........... H04N 1/00334; H04N 1/32122; H04N 1/32133; H04N 1/4473; H04N 2201/3202;
(Continued)

(56) References Cited

U.S. PATENT DOCUMENTS

| 2007/0206205 A1* | 9/2007 | Suzuki | ............... G03G 15/5091 |
| | | | 358/1.15 |
| 2008/0065263 A1* | 3/2008 | Sugawara | .......... H04N 1/32133 |
| | | | 700/215 |

(Continued)

FOREIGN PATENT DOCUMENTS

| JP | 2006-338447 A | 12/2006 |
| JP | 2007-4431 A | 1/2007 |

*Primary Examiner* — Nicholas Pachol
(74) *Attorney, Agent, or Firm* — KENEALY VAIDYA LLP

(57) ABSTRACT

A printed material management system includes a non-transitory computer readable medium storing a management program, a server, and a shredder. The management program is configured to cause a controller of a device in which the management program is installed to execute a print data acquisition process of acquiring print data, a generation process of determining a printed material ID, and generating a code by encoding the determined printed material ID, a printing process of printing the code and an image on a page corresponding to the printed material ID, and a transmission process of transmitting, to the server, a print log including the printed material ID and first data indicating that disposal is not completed. In a case where the code is successfully read, the shredder executes a rewriting process of transmitting a rewriting request associated with the printed material ID.

13 Claims, 10 Drawing Sheets

(51) Int. Cl.
*B02C 25/00* (2006.01)
*H04N 1/32* (2006.01)
*H04N 1/44* (2006.01)

(58) Field of Classification Search
CPC ........ H04N 2201/3269; B02C 18/0007; B02C 25/00
See application file for complete search history.

(56) References Cited

U.S. PATENT DOCUMENTS

| | | | |
|---|---|---|---|
| 2009/0106249 A1* | 4/2009 | Saito | H04N 1/4426 |
| | | | 707/999.009 |
| 2009/0234497 A1* | 9/2009 | Uejo | B02C 18/0007 |
| | | | 700/226 |
| 2009/0240740 A1* | 9/2009 | Ohsawa | H04N 1/32101 |
| 2011/0106753 A1* | 5/2011 | Hamada | H04N 1/00408 |
| | | | 707/E17.008 |
| 2012/0249131 A1* | 10/2012 | Yamaguchi | H04N 1/4473 |
| | | | 324/244 |
| 2013/0016376 A1* | 1/2013 | Hashidume | G03G 15/01 |
| | | | 358/1.9 |
| 2013/0070305 A1* | 3/2013 | Tomizawa | G06K 15/1806 |
| | | | 358/3.28 |
| 2015/0186081 A1* | 7/2015 | Albrecht | G06F 3/1273 |
| | | | 358/1.15 |
| 2015/0186760 A1* | 7/2015 | Albrecht | H04N 1/0032 |
| | | | 358/498 |
| 2020/0384478 A1* | 12/2020 | Bae | G06K 7/087 |
| 2023/0254432 A1* | 8/2023 | Kusumoto | B02C 18/0007 |
| | | | 241/101.2 |

* cited by examiner

FIG. 3

| USER ID | TERMINAL ID | DOCUMENT ID | PAGE ID | PRINTING DATE | DISPOSAL INFORMATION | DISPOSAL DATE |
|---|---|---|---|---|---|---|
| 11015548 | PC-001 | Doc00001 | 1 | 2021/6/29 | NOT COMPLETED | |
| 11015548 | PC-001 | Doc00001 | 2 | 2021/6/29 | NOT COMPLETED | |
| 11015548 | PC-001 | Doc00001 | 3 | 2021/6/29 | NOT COMPLETED | |
| 11015548 | PC-001 | Doc00002 | 1 | 2021/7/1 | COMPLETED | 2021/8/1 |
| | | | ⋯ | | | | ously
PRINTED MATERIAL MANAGEMENT SYSTEM INCLUDING SYSTEM AND METHOD FOR CONTROLLING A SHREDDER

REFERENCE TO RELATED APPLICATIONS

This application claims priority from Japanese Patent Application No. 2022-019492 filed on Feb. 10, 2022. The entire content of the priority application is incorporated herein by reference.

BACKGROUND ART

In recent years, due to the spread of telework and the like, the demand for printing outside the office has increased. Printing outside the office has a problem of safety such as information leakage due to loss of printed materials, and a system for managing printed materials is known as one measure against the problem. A document management system including a multi function device, a shredder, and a server, in which when a document is printed, the multi function device outputs a printed material to which a two-dimensional code including a document ID is attached, and the server stores the document ID, and when the printed material is disposed, the shredder reads the two-dimensional code, then performs disposal of the printed material, and notifies the server of the document ID included in the read two-dimensional code.

DESCRIPTION

A shredder used in the document management system mentioned above rewrites information on a printed material managed by a server by reading a two-dimensional code. However, the reading of the two-dimensional code may fail, and for example, when disposal is performed on a printed material from which the two-dimensional code is not read, the information of the server may not be rewritten even though disposal of the printed material is completed, which makes it difficult to manage the printed material. A case in which the shredder fails to read a two-dimensional code is not disclosed, and there is room for improvement.

The technique disclosed in the present specification is a printed material management system for managing printed materials, and an object thereof is to implement a technique for improving the reliability of the management of printed materials.

According to an aspect of the invention, a printed material management system includes a non-transitory computer readable medium storing a management program, a server, and a shredder. The management program is configured to cause a controller of a device in which the management program is installed to execute a print data acquisition process of acquiring print data, a generation process of determining a printed material ID for each page to be printed based on the print data acquired in the print data acquisition process, and generating a code by encoding the determined printed material ID, a printing process of printing the code generated in the generation process and an image on a page corresponding to the printed material ID encoded in the code on the same sheet using a printer, and a transmission process of transmitting, to the server, a print log including the printed material ID and first data indicating that disposal is not completed. The print log transmitted by the management program is stored in the server. The shredder includes an inlet, a cutter, and a scanner. The shredder is configured to convey a printed material input from the inlet and execute a reading process of reading the code printed on the printed material using the scanner. In a case where the code is successfully read in the reading process, the shredder is configured to execute a rewriting process of transmitting a rewriting request associated with the printed material ID encoded in the code read in the reading process to the server, and causing the server to rewrite the first data included in the print log corresponding to the printed material ID associated with the rewriting request among print logs stored in the server to second data indicating that disposal is completed, and a shredding process of shredding the printed material, which is read in the reading process, using the cutter. In a case where the code is not successfully read in the reading process, the shredder is configured to execute a discharge process of discharging the printed material subjected to the reading process to the outside of the device without executing the rewriting process and the shredding process and shredding the printed material.

According to the technique disclosed in the present specification, when the shredder succeeds in reading the code of the printed material, the shredder transmits the printed material ID indicated by the read code to the server in addition to the shredding of the printed material, and causes the server to rewrite the first data (data indicating that disposal is not completed) included in the print log corresponding to the printed material ID to the second data (data indicating that disposal is completed), thereby enabling the server to manage whether disposal of the printed material is completed. On the other hand, when the shredder fails to read the code of the printed material, the shredder does not rewrite the print log and discharges the printed material to the outside of the device without shredding the printed material, thereby reliably managing the printed material without reducing the reliability of the print log.

According to the technique disclosed in the present specification, an operation of a shredder based on a reading result of a code contributes to improvement of the reliability of the management of printed materials, which is a printed material management system for managing printed materials.

FIG. 3 is an explanatory diagram showing a schematic configuration of print log information.

Hereinafter, an embodiment of a printed material management system according to the present embodiment will be described in detail with reference to the drawings.

Recently, the number of companies introducing "telework" has increased rapidly amid calls for work style reforms aimed at securing human resources and improving productivity. The telework is classified into "work from home", "satellite office work", and "mobile work" depending on a work place, and among them, it is considered that "work from home" is introduced as the "telework" in many companies. Meanwhile, in the case of "work from home", for example, when an employee works from home, many printed materials including corporate confidentiality may be printed at the home of the employee, and it is necessary to appropriately manage the printed materials including corporate confidentiality until the printed materials are disposed. The printed material management system according to the present embodiment is, for example, a system for appropriately managing a printed material printed at a home of an employee until the printed material is disposed.

Figure 1:
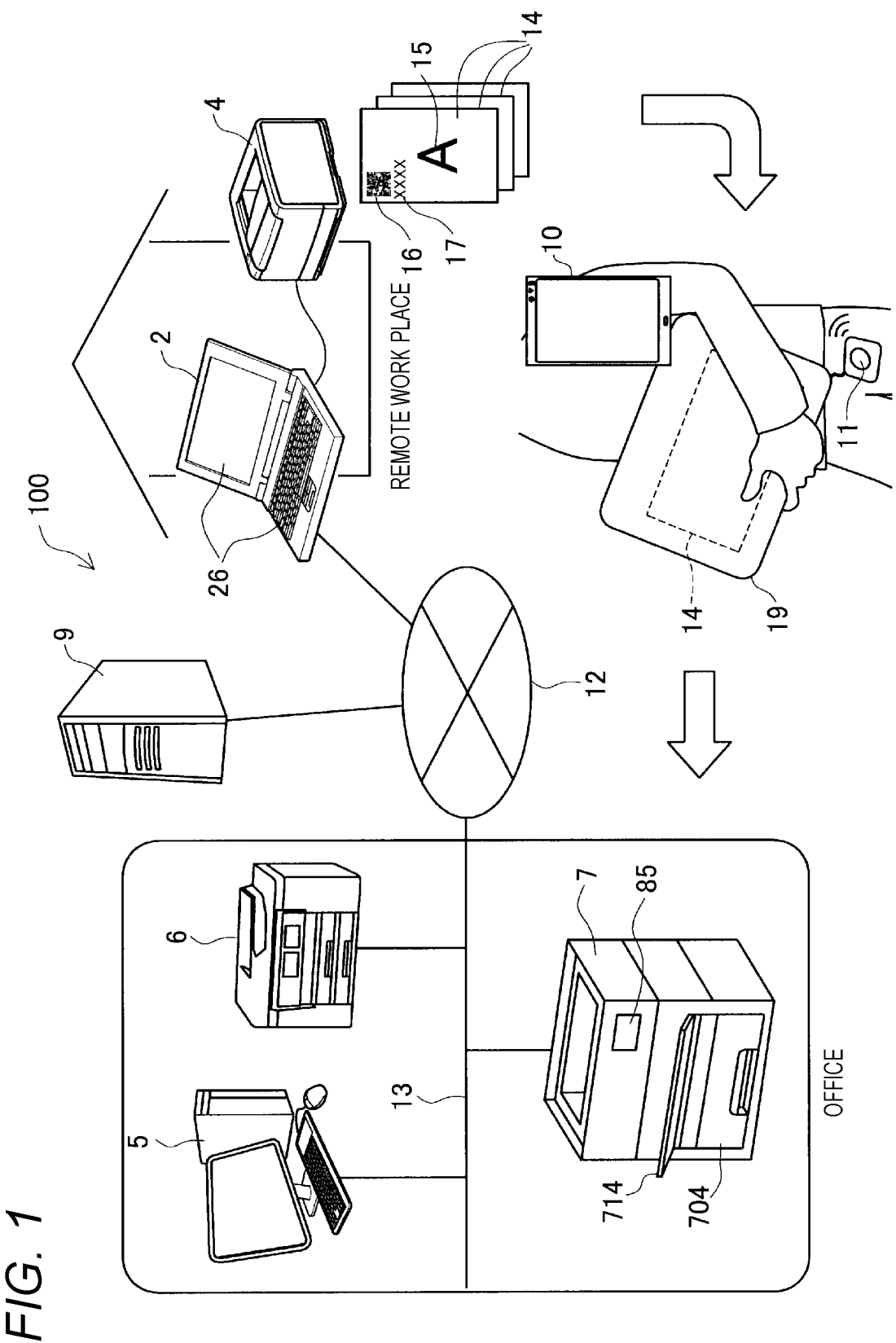
FIG. 1 is an explanatory diagram showing a schematic configuration of a printed material management system according to an embodiment of the present invention.

FIG. 1 is an explanatory diagram showing a schematic configuration of the printed material management system according to the present embodiment, which will be described in detail below with reference to the drawings. As shown in FIG. 1, the printed material management system 100 according to the present embodiment includes: a personal computer (hereinafter, referred to as a "PC") 2 and a printer 4 disposed at a telework place, for example, at a home of an employee; a management terminal device 5, a printing device 6, and a shredding device 7 disposed at a work place of the employee, for example, at an office where the employee normally works; a cloud server 9; a monitoring device 10 possessed by the employee; and an electronic tag 11. The PC 2 is an example of a device and an information processing device, the shredding device 7 is an example of a shredder, and the cloud server 9 is an example of a server.

Further, the PC 2 is communicably connected to the cloud server 9 via, for example, an Internet line 12. The management terminal device 5, the printing device 6, and the shredding device 7 are communicably connected to one another via a local area network (hereinafter, referred to as a "LAN") 13 installed in the office. Since the LAN 13 is connected to the Internet line 12, the management terminal device 5 and the shredding device 7 are communicably connected to the cloud server 9 via the LAN 13 and the Internet line 12.

In the present embodiment, a home of an employee is used as a telework place, and the telework place is not limited thereto. For example, the telework place may be a satellite office, an extended-stay hotel, a villa, or the like. In the present embodiment, a work place of an employee is, for example, an office where the employee normally works, and the work place is not limited thereto. That is, the work place of an employee may be anywhere as long as the shredding device 7 communicably connected to the cloud server 9 is installed, and may be, for example, a satellite office prepared at a work place. In the present embodiment, the cloud server 9 is connected to the Internet line 12, and the cloud server 9 is not limited thereto. For example, the cloud server 9 may be a server connected to the LAN 13.

Figure 2:
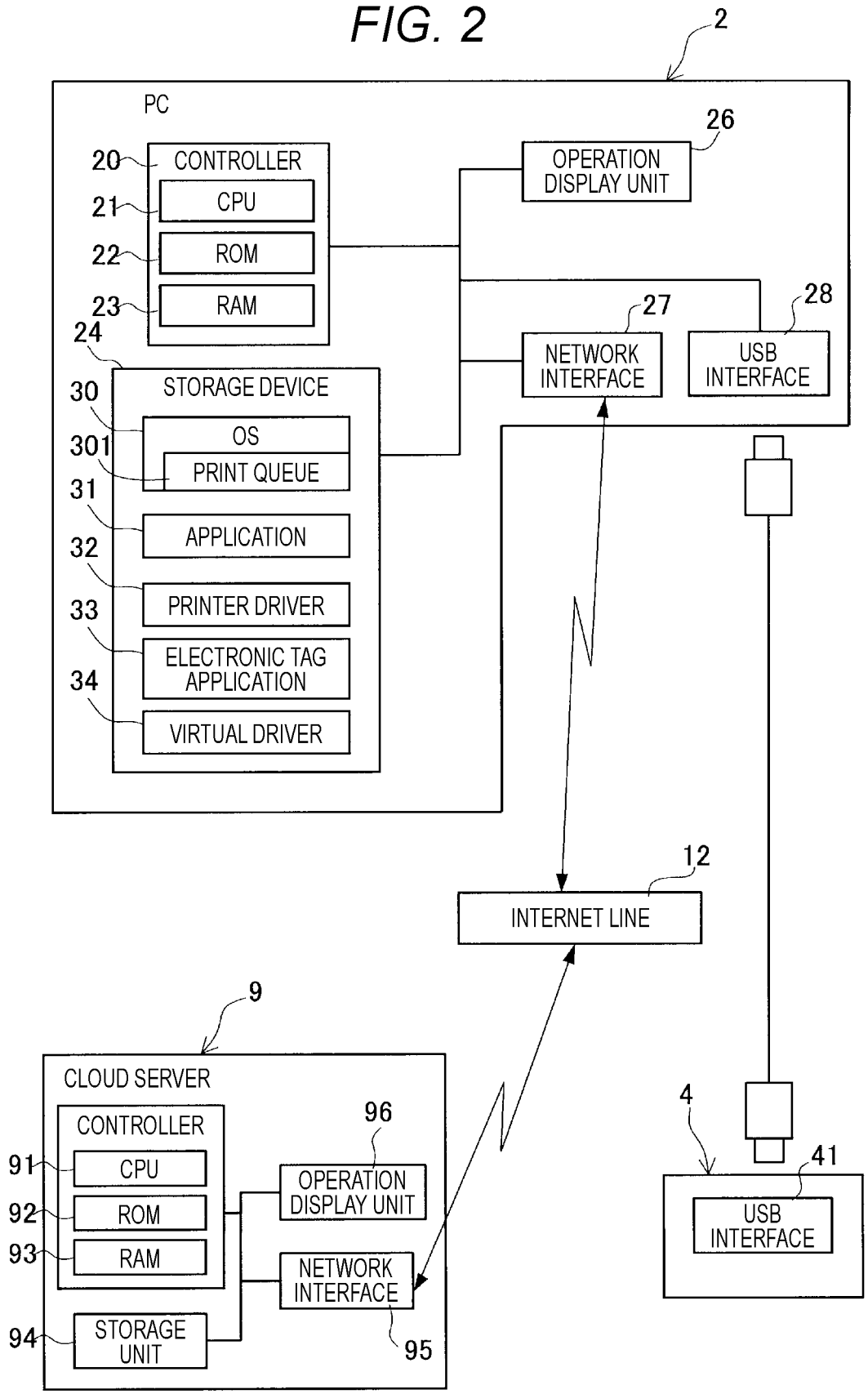
FIG. 2 is a schematic explanatory diagram showing electrical configurations of a personal computer and a cloud server.

FIG. 2 is a schematic explanatory diagram showing electrical configurations of a personal computer and a cloud server, which will be described in detail below with reference to the drawings. That is, as shown in FIG. 2, the PC 2 includes a controller 20 including a CPU 21, a ROM 22, and a RAM 23, a storage device 24, an operation display unit 26, a network interface 27, and a USB interface 28. The ROM 22 stores, for example, an activation program for activating the PC 2. The RAM 23 is used as a work area when various processes are executed, or as a storage area for temporarily storing data. The CPU 21 is an example of a controller.

The storage device 24 includes, for example, a semiconductor memory such as a flash memory or a hard disk drive (HDD). An operating system (hereinafter, referred to as an "OS") 30, an application program (hereinafter, referred to as an "application") 31, a printer driver 32, an electronic tag application 33, and a virtual driver 34 are incorporated in the storage device 24. The OS 30 is, for example, Windows, and may be macOS, IOS, Android or Linux. Windows is a registered trademark of Microsoft Corporation. MacOS and iOS are registered trademarks of Apple Inc. Android is a registered trademark of Google LLC. Linux is a registered trademark of Linus Torvalds.

The application 31 is a program for executing a process for a specific purpose, and specifically, for example, is a program capable of receiving an image serving as image data, receiving editing of the image, receiving a print setting, designating the printer 4 to execute printing, receiving an instruction to execute printing, and the like via the operation display unit 26. The application 31 may include various application programs such as a document creation program, a spreadsheet program, and a web browser.

The printer driver 32 is a program corresponding to a model of the printer 4, and is a program that communicates with the printer 4 via the USB interface 28 to control an operation of the printer 4. The printer driver 32 is activated, for example, when an instruction for a property setting of the printer 4 is received in a state where the printer 4 is designated by the application 31 or the like.

When the printer driver 32 receives print instruction information from the OS 30, the printer driver 32 acquires image data specified by the print instruction information, and generates print data based on the acquired image data. The printer driver 32 then transmits a print job including the generated print data and an acquired print setting to the printer 4 via a print queue 301 and an output port (not shown) managed by the OS 30.

The electronic tag application 33 is activated by an employee (user), and when activated, the electronic tag application 33 constantly monitors a state of a print job in the print queue 301. When a print job is output from the printer driver 32 to the print queue 301, the electronic tag application 33 acquires the print job.

After generating two-dimensional barcode print data for printing a two-dimensional barcode 16 shown in FIG. 1 on a printing sheet 14 and printed material ID print data for printing a printed material ID 17 on the printing sheet 14, the electronic tag application 33 inserts the two-dimensional barcode print data and the printed material ID print data into print data of the acquired print job. The electronic tag application 33 is an example of a printed material management program.

When printing by the printer 4 is completed, the electronic tag application 33 generates print log information 18 shown in FIG. 3, and uploads the generated print log information 18 to the cloud server 9.

The virtual driver 34 is activated by the electronic tag application 33 and transmits a print job generated by the electronic tag application 33 to the printer 4 via the output port.

The electronic tag application 33 and the virtual driver 34 are downloaded from the cloud server 9 to the PC 2 by an employee (user) in advance, and are stored in the storage device 24. As another installation method, a recording medium in which the electronic tag application 33 and the virtual driver 34 are stored, for example, a USB memory or a CD-ROM may be set in the PC 2, and the virtual driver 34 read from the recording medium may be stored in the storage device 24. When the electronic tag application 33 and the virtual driver 34 are stored in the storage device 24, a user ID 181 and a terminal ID 182 in the print log information 18 shown in FIG. 3 are set and stored by an employee (user).

In the present embodiment, although the virtual driver 34 has a form different from that of the printer driver 32, for example, when a manufacturing company of the printed material management system 100 and a manufacturing company of the printer 4 are the same, a function of the virtual driver 34 may be integrated into the printer driver 32. In the present embodiment, since the manufacturing company of the printed material management system 100 is different from the manufacturing company of the printer 4, the virtual driver 34 is configured in a form different from that of the printer driver 32.

The CPU 21 executes various processes in accordance with the programs read from the ROM 22 and the storage device 24.

The operation display unit 26 includes, for example, a display device, a keyboard, and the like, which are provided integrally with a housing of the PC 2. The display device displays necessary information, and the keyboard receives an input from a user. The keyboard may be implemented with a touch panel integrally provided on the display device.

In the present embodiment, the PC 2 is implemented with a notebook personal computer, and may be implemented with a desktop personal computer. In this case, the PC 2 includes an interface for connecting devices that implement a function of the operation display unit 26, specifically, a keyboard, a mouse, a display, and the like. The PC 2 may be configured by a smartphone, a tablet, and the printer 4.

The network interface 27 is an interface including a communication circuit for communicating with the cloud server 9 via the Internet line 12.

The USB interface 28 is an interface including a communication circuit for communicating with the printer 4 via a USB cable. Therefore, by connecting a USB cable to a USB interface 41 of the printer 4 and the USB interface 28, the PC 2 and the printer 4 may communicate with each other by wire.

As shown in FIG. 1, an image forming unit (not shown) of the printer 4 prints an image 15, the two-dimensional barcode 16, and the printed material ID 17 on the printing sheet 14 to be printed, based on print data, two-dimensional barcode print data, and printed material ID print data transmitted from the PC 2. An image forming method of the image forming unit may be a thermal printing method, an electrophotographic method, an inkjet printing method, or any other method. The image forming unit may use an image forming method capable of color printing, or an image forming method that supports only monochrome printing.

In the present embodiment, the image forming unit of the printer 4 uses, for example, an inkjet printing method corresponding to color printing. As the printing sheet 14 to be printed, a plain sheet and a photo sheet are used.

As shown in FIG. 2, the cloud server 9 includes a CPU 91, a ROM 92, a RAM 93, a storage unit 94, an operation display unit 96, and a network interface 95. The ROM 92 stores, for example, an activation program for activating the cloud server 9. The RAM 93 is used as a work area when various processes are executed, or as a storage area for temporarily storing data.

The storage unit 94 includes, for example, an HDD and a flash memory, and stores various processing programs and data such as the print log information 18 shown in FIG. 3.

The CPU 91 executes various processes in accordance with the programs read from the ROM 92 and the storage unit 94.

The operation display unit 96 includes, for example, a display device, a touch panel disposed on the display device, and the like. The display device displays necessary information, and the touch panel receives an input from a user.

In the configuration of the operation display unit 96, a device for implementing a function of the operation display unit 96 may be provided separately from a housing of the cloud server 9. In this case, the cloud server 9 includes an interface for connecting devices that implement the function of the operation display unit 96, specifically, a keyboard, a mouse, a display, and the like.

FIG. 3 is an explanatory diagram showing a schematic configuration of the print log information 18. The print log information 18 includes one or more records, and each record includes a user ID 181, a terminal ID 182, a document ID 183, a page ID 184, a printing date 185, disposal information 186, and a disposal date 187. The document ID 183 and the page ID 184 constitute the printed material ID 17. The records constituting the print log information 18 is an example of a print log.

In the present embodiment, the document ID 183 and the page ID 184 constitute the printed material ID 17, and the present invention is not limited thereto. For example, the printed material ID 17 only needs to be able to identify the printing sheet 14, and may include, for example, the user ID 181, the terminal ID 182, the document ID 183, the page ID 184, and the printing date 185 either alone or a plurality of combinations thereof.

The user ID 181 may be an employee code of an employee (user) company. The terminal ID 182 may be a user name of the PC 2. The document ID 183 is given as a serial number in the order of printing in file name units to a printed material formed by the printing sheet 14 printed using the PC 2. The page ID 184 indicates the page number of a printed material in file name units. The printing date 185 represents the date of printing using the PC 2, and may further include the time of printing. The disposal information 186 is information indicating whether a printed material printed using the PC 2 is shredded by the shredding device 7 in page units of the printed material. The disposal date 187 represents the date when a printed material printed using the PC 2 is shredded by the shredding device 7, and may further include the time of disposal.

Returning to FIG. 1, the management terminal device 5 is implemented with a personal computer or the like including a controller, a storage unit, a user interface, a network interface (none of which are shown), and the like. The network interface of the management terminal device 5 is implemented with an interface of a wired LAN communication standard. In addition, the network interface may be, for example, an interface of a wireless LAN communication standard such as Wi-Fi or an interface of a USB communication standard. The network interface is connected to the LAN 13, and is communicably connected to the printing device 6 and the shredding device 7. The network interface is communicably connected to the cloud server 9 and the monitoring device 10 via the LAN 13 and the Internet line 12.

The storage unit of the management terminal device 5 stores a printing fee management program (not shown) for managing a printing fee based on the print log information 18 stored in the storage unit 94 of the cloud server 9. Therefore, in the present embodiment, by executing the printing fee management program in the management terminal device 5, it is possible to manage, based on the print log information 18, a printing fee corresponding to the number of printing sheets 14 shredded by the shredding device 7 among printing sheets 14 printed by an employee (user) at home using the printer 4 for each employee (user). It is also possible to perform payment management for the employee (user) with respect to the printing fee.

The printing device 6 includes an image forming unit and a network interface (both not shown), and the like. An image forming method of the image forming unit may be a thermal printing method, an electrophotographic method, an inkjet printing method, or any other method. The image forming unit may use an image forming method capable of color printing, or an image forming method that supports only monochrome printing. The network interface of the printing device 6 is implemented with an interface of a wired LAN communication standard. In addition, the network interface may be, for example, an interface of a wireless LAN communication standard such as Wi-Fi or an interface of a USB communication standard. The network interface is connected to the LAN 13, and is communicably connected to the management terminal device 5.

Figure 4:
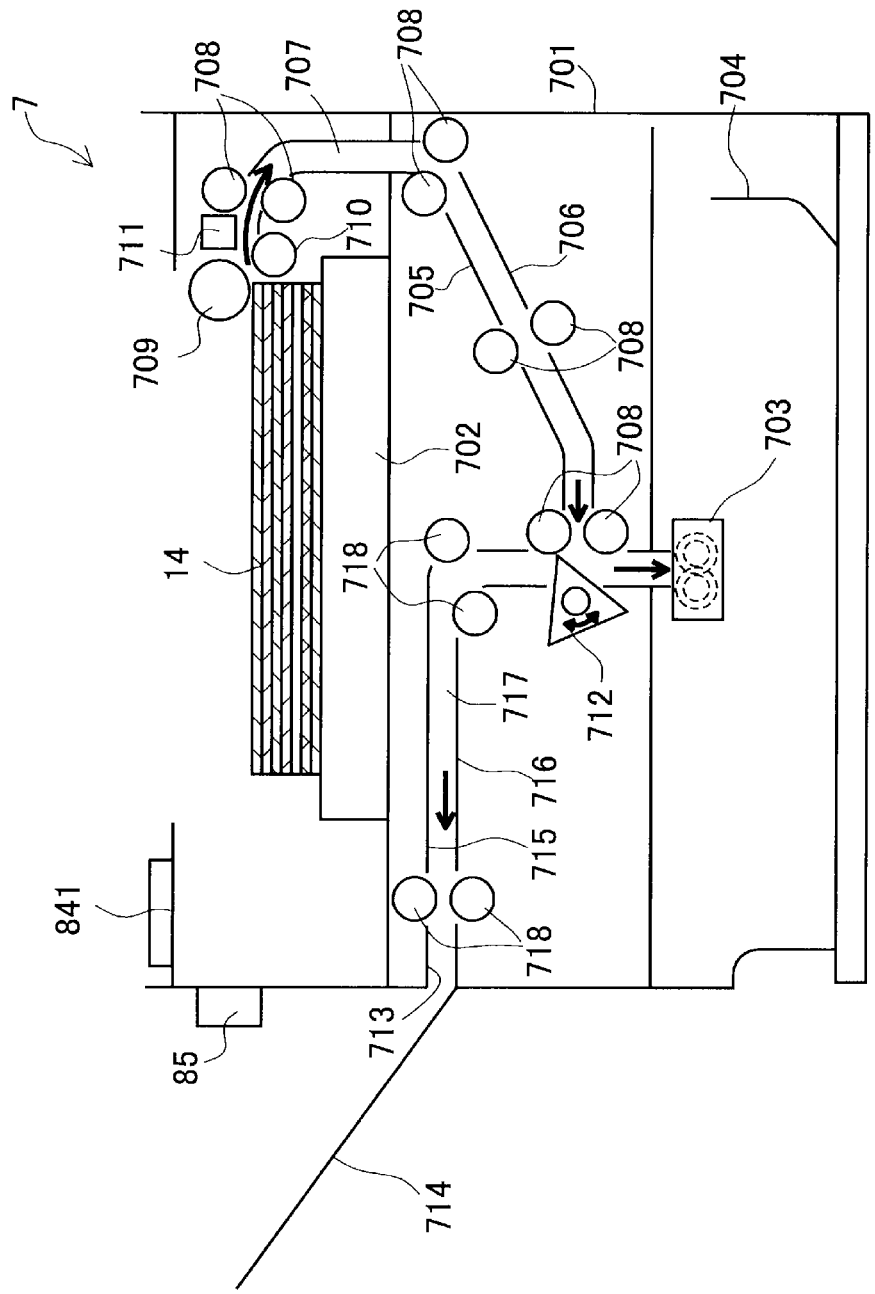
FIG. 4 is a cross-sectional view showing a schematic configuration of a shredding device.

FIG. 4 is a cross-sectional view showing a schematic configuration of a shredding device, which will be described in detail below with reference to the drawings. In the shredding device 7, a placement portion 702 for placing the printing sheet 14 (printed material) to be shredded with a printing surface facing upward is disposed at an upper position in a housing 701. A shredding portion 703 including two cutters is disposed at a lower position in the housing 701. Below the shredding portion 703, a storage tray 704 for storing sheet pieces shredded by the shredding portion 703 is disposed so as to be removable from the housing 701.

A first conveying path 707 defined by two first guide plates 705 and 706 facing each other with an interval therebetween is disposed in the housing 701, and the first conveying path 707 extends from the placement portion 702 toward the shredding portion 703. A plurality of first conveying rollers 708 are rotatably disposed along the first conveying path 707.

In the present embodiment, the printing sheet 14 (printed material) to be shredded is placed on the placement portion 702, and the placement portion 702 may be implemented with a tray disposed adjacent to an entrance of the first conveying path 707 on an upper surface or a side surface of the housing 701. The placement portion 702 is an example of an inlet.

A pickup roller 709 and a retard roller 710 are rotatably disposed on a side of the first conveying path 707 on the placement portion 702 side. The placement portion 702 may raise the printing sheet 14 placed on the placement portion 702 from below such that the placed printing sheet 14 comes into contact with the pickup roller 709.

Therefore, when the pickup roller 709 and the retard roller 710 rotate in a state where the printing sheet 14 is in contact with the pickup roller 709, the uppermost printing sheet 14 among the printing sheets 14 placed on the placement portion 702 is conveyed into the first conveying path 707. Thereafter, the printing sheet 14 is conveyed in the first conveying path 707 toward the shredding portion 703 as the first conveying rollers 708 rotate.

In the housing 701 of the shredding device 7, a reading device 711 is disposed adjacent to the pickup roller 709. The reading device 711 may read the two-dimensional barcode 16 printed on the printing sheet 14 conveyed through the first conveying path 707. A plurality of the reading devices 711 may be disposed such that the two-dimensional barcode 16 may be read even when the printing sheet 14 (printed material) to be shredded is placed on the placement portion 702 in any direction (directions different from each other by 180 degrees). The reading device 711 is an example of a scanner.

A switching claw 712 is disposed in the first conveying path 707. A discharge port 713 and a discharge tray 714 are provided on the side surface of the housing 701 of the shredding device 7. A second conveying path 717 defined by two second guide plates 715 and 716 facing each other with an interval therebetween is disposed in the housing 701, and the second conveying path 717 extends from the switching claw 712 toward the discharge port 713. A plurality of second conveying rollers 718 are rotatably disposed along the second conveying path 717.

Therefore, when the switching claw 712 is rotated clockwise from a position shown in FIG. 4, a conveying direction of the printing sheet 14 conveyed through the first conveying path 707 is switched to a direction toward the second conveying path 717 by the switching claw 712. Then, the conveying direction is switched, and the printing sheet 14 is further conveyed toward the discharge port 713 through the second conveying path 717 as the second conveying rollers 718 rotate, and then discharged onto the discharge tray 714.

A receiving unit 841 of a second communication interface 84, which will be described later, is disposed on the upper surface of the housing 701 of the shredding device 7.

Figure 5:
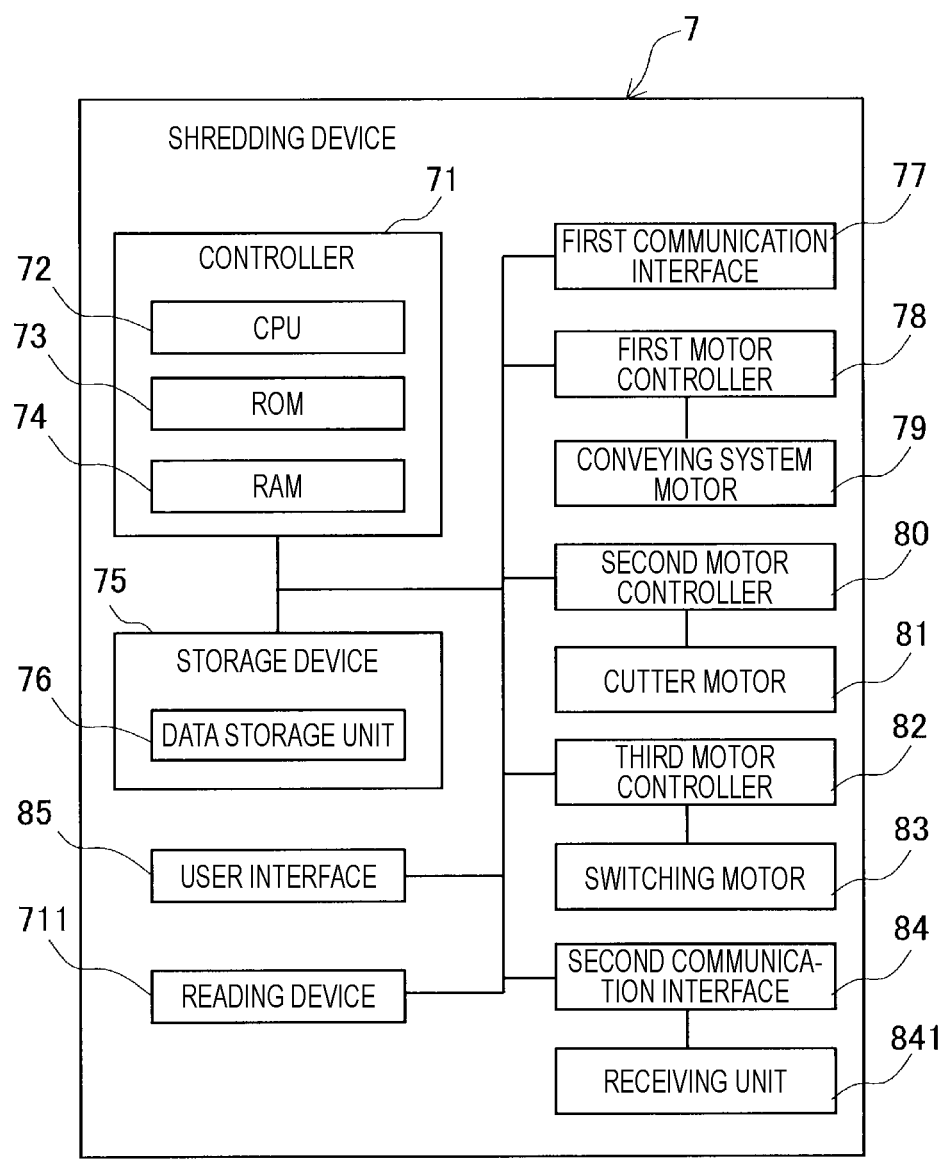
FIG. 5 is a schematic explanatory diagram showing an electrical configuration of the shredding device.

FIG. 5 is a schematic explanatory diagram showing an electrical configuration of a shredding device, which will be described in detail below with reference to the drawings. The shredding device 7 includes a controller 71. The controller 71 includes a CPU 72, a ROM 73, and a RAM 74. The CPU 72 is a central processing unit that executes various control programs. The ROM 73 stores the various control programs executed by the CPU 72 and permanent data. The RAM 73 temporarily stores calculation results of the control programs by the CPU 72 and the like. The controller 71 in FIG. 5 is a collective term of hardware and software used to control the shredding device 7, and does not necessarily represent a single piece of hardware that actually exists in the shredding device 7.

The shredding device 7 includes a storage device 75 connected to the controller 71. As the storage device 75, for example, a hard disk drive (HDD) or a solid state drive (SSD) may be used. The storage device 75 includes a data storage unit 76.

The shredding device 7 includes a first communication interface 77 connected to the controller 71. In the present embodiment, the first communication interface 77 is implemented with an interface of a wired LAN communication standard. In addition, the network interface may be, for example, an interface of a wireless LAN communication standard such as Wi-Fi or an interface of a USB communication standard. The first communication interface 77 is connected to the LAN 13 and is communicably connected to the management terminal device 5. The first communication interface 77 is communicably connected to the cloud server 9 via the LAN 13 and the Internet line 12. Therefore, the controller 71 of the shredding device 7 may upload the information stored in the data storage unit 76 of the storage device 75 to the cloud server 9.

The shredding device 7 includes a first motor controller 78 connected to the controller 71. The first motor controller 78 may control the rotation of conveying system motors 79 for driving the rotation of the pickup roller 709, the retard roller 710, the first conveying rollers 708, and the second conveying rollers 718.

The shredding device 7 includes a second motor controller 80 connected to the controller 71. The second motor controller 80 may control the rotation of a cutter motor 81 for driving the rotation of the cutters of the shredding portion 703.

The shredding device 7 includes a third motor controller 82 connected to the controller 71. The third motor controller 82 may control the rotation of a switching motor 83 for driving the rotation of the switching claw 712.

The shredding device 7 includes the second communication interface 84 connected to the controller 71. In the present embodiment, the second communication interface 84 is implemented with an interface of a short-range wireless communication standard of a near field communication (NFC). The second communication interface 84 is communicably connected to the monitoring device 10 when the monitoring device 10 approaches the receiving unit 841 disposed on the upper surface of the housing 701 of the shredding device 7 within a range of several centimeters. At this time, the information read from the monitoring device 10 is stored in the data storage unit 76 of the storage device 75 via the controller 71. The second communication interface 84 is an example of an input interface.

The shredding device 7 includes a user interface 85 connected to the controller 71. In the present embodiment, the user interface 85 is implemented with a touch panel having a display function and an operation receiving function. In addition, the user interface 85 may be configured by a combination of, for example, a display such as a liquid crystal display or an organic EL display that displays information and a keyboard or the like that receives an input operation by a user.

The reading device 711 connected to the controller 71 reads the two-dimensional barcode 16 printed on the printing sheet 14 conveyed through the first conveying path 707. The read information is stored in the data storage unit 76 of the storage device 75 via the controller 71.

Figure 6:
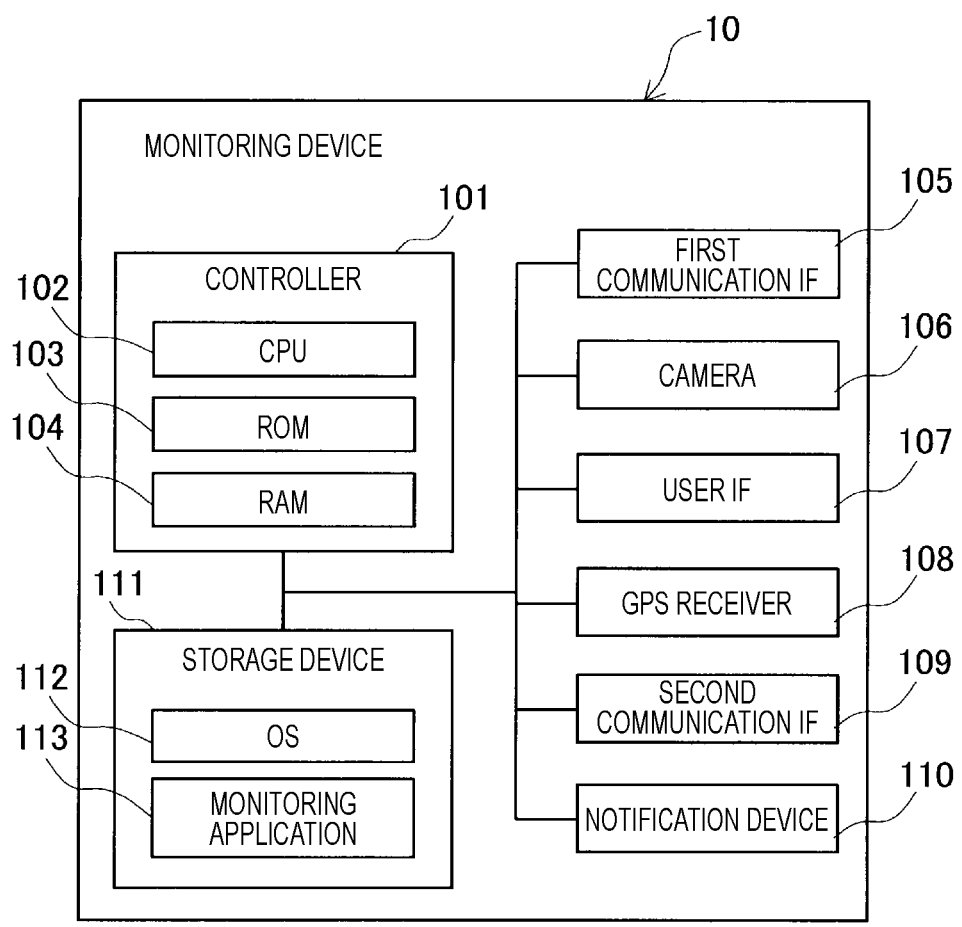
FIG. 6 is a schematic explanatory diagram showing an electrical configuration of a monitoring device.

FIG. 6 is a schematic explanatory diagram showing an electrical configuration of a monitoring device, which will be described in detail below with reference to the drawings. The monitoring device 10 is implemented with, for example, a smartphone or a tablet, and the smartphone or the tablet may be owned by an employee (user) or may be owned by a company where the employee works. In the present embodiment, the smartphone is implemented with a smartphone owned by an employee (user).

The monitoring device 10 includes a controller 101 as illustrated. The controller 101 serves as a control center for the monitoring device 10. The controller 101 includes a CPU 102, a ROM 103, and a RAM 104. The CPU 102 is a central processing unit that executes various control programs, and is an example of a computer. The ROM 103 stores the various control programs executed by the CPU 102 and permanent data. The RAM 104 temporarily stores calculation results of the control programs by the CPU 102 and the like. The controller 101 in FIG. 6 is a collective term of hardware and software used to control the monitoring device 10, and does not necessarily represent a single piece of hardware that actually exists in the monitoring device 10. The monitoring device 10 is an example of a portable device.

The monitoring device 10 includes a first communication interface (hereinafter, referred to as a "first communication IF") 105, a camera 106, a user interface (hereinafter, referred to as a "user IF") 107, a GPS receiver 108, a second communication interface (hereinafter, referred to as a "second communication IF") 109, a notification device 110, and the like.

The first communication IF 105 is implemented with an interface of a wireless LAN communication standard such as Wi-Fi, and may be connected to the Internet line 12. Therefore, the monitoring device 10 is communicably connected to the cloud server 9.

The camera 106 is connected to the controller 101 and is capable of photographing any subject. In addition, the camera 106 includes hardware having an imaging function, and may be incorporated in a main body of the monitoring device 10, or may be a separate body that may be connected to the monitoring device 10.

The user IF 107 is implemented with a touch panel having both a display function and an operation receiving function, and is connected to the controller 101. The user IF 107 may include a combination of, for example, a display such as a liquid crystal display or an organic EL display that displays information and a keyboard, a mouse, or the like that receives an input operation by a user.

The GPS receiver 108 receives signals from satellites, and provides functions such as detection of a position of the monitoring device 10 and acquisition of accurate time information. The "GPS" is an abbreviation for "global positioning system".

The second communication IF 109 is implemented with an interface of a short-range wireless communication standard such as Bluetooth and NFC. The second communication IF 109 is communicably connected to the electronic tag 11 by a Bluetooth communication function when the electronic tag 11 approaches the monitoring device 10 within a range of about 10 m to 20 m. The second communication IF 109 is communicably connected to the shredding device 7 by an NFC communication function when the monitoring device 10 approaches the receiving unit 841 of the shredding device 7 within a range of several centimeters. Bluetooth is a registered trademark of Bluetooth SIG, Inc.

The notification device 110 is implemented with a buzzer, a speaker, or the like, and may be implemented with an optical element such as an LED or a display, or a vibrator.

The monitoring device 10 includes a storage device 111. As the storage device 111, for example, a semiconductor memory such as a flash memory or an HDD may be used. The storage device 111 stores an operating system (hereinafter, referred to as an "OS") 112, a monitoring application program (hereinafter, referred to as a "monitoring application") 113, and the like.

The OS 112 is iOS. In addition, for example, any one of Windows, macOS, Linux, and Android may be used.

The monitoring application 113 may be used, for example, by being downloaded from the cloud server 9 via the Internet line 12 and installed in the monitoring device 10. The monitoring application 113 may be downloaded from the management terminal device 5 instead of the cloud server 9.

The monitoring device 10 and the electronic tag 11 are paired by the Bluetooth communication function by bringing the electronic tag 11 close to the monitoring device 10 within a range of about 10 m to 20 m when the monitoring application 113 is activated on the monitoring device 10. Thereafter, when the communication between the electronic tag 11 and the monitoring device 10 is interrupted due to a distance between the electronic tag 11 and the monitoring device 10 being increased, the monitoring device 10 generates a warning sound via the notification device 110. Accordingly, it is possible to notify an employee (user) that the electronic tag 11 is separated from the monitoring device 10 by a predetermined range or more, that is, in a lost state.

In the present embodiment, the electronic tag 11 is used by being connected to a bag 19 in which the printing sheet 14 (printed material) is stored, or stored in the bag. The electronic tag 11 may be used by being connected to, for example, a clip for nipping the printing sheet 14 (printed material).

Figure 7:
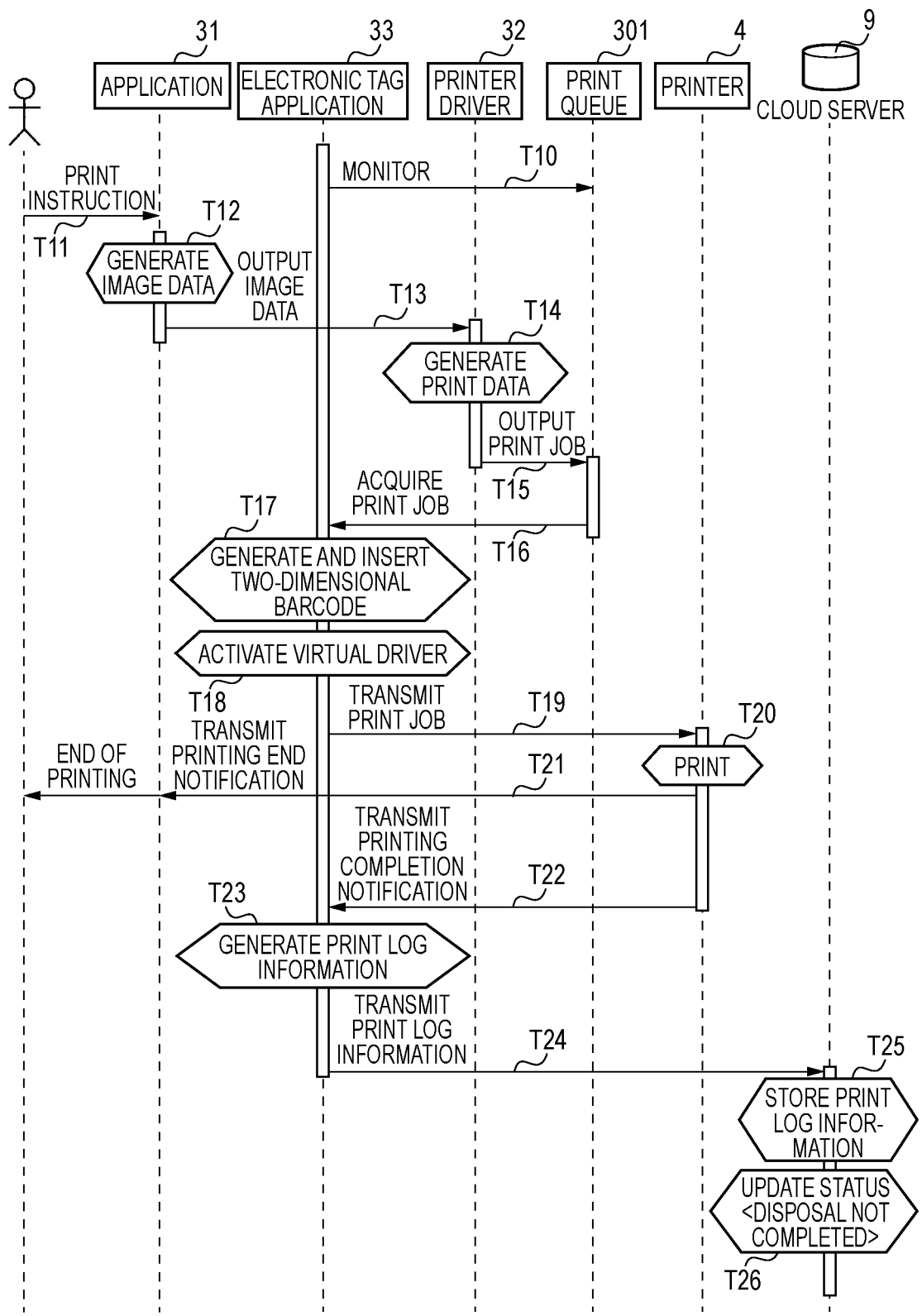
FIG. 7 is a sequence diagram showing a procedure of a printing process using a personal computer and a printer.

FIG. 7 is a sequence diagram showing a procedure of a printing process using a personal computer and a printer, which will be described in detail below with reference to the drawings. In the present specification, an operation of each program will be described while omitting the description of the OS 30. That is, in the following description, the description that "a program B controls hardware C" may refer to "a program B controls hardware C using an API of an OS 41". Processes of the CPU 21 according to instructions described in the programs may be described in abbreviated terms. For example, "executed by a CPU" or "executed by a program" may be described.

First, in FIG. 7, when the electronic tag application 33 is activated as the PC 2 is activated prior to printing by the printer 4, the electronic tag application 33 constantly monitors a state of the print queue 301 (procedure 10 (hereinafter, referred to as "T10")).

Next, an employee (user) issues a print instruction to the application 31 via the operation display unit 26 in the PC 2 (T11). Then, the application 31 generates image data of the image 15 created by the employee (user) using the application 31 (T12), and then outputs the generated image data to the printer driver 32 (T13).

Then, the printer driver 32 generates print data based on the acquired image data (T14). Then, the printer driver 32 outputs a print job including the generated print data and an acquired print setting and the like to the print queue 301 managed by the OS 30 (T15).

Since the electronic tag application 33 constantly monitors the print queue 301 (T10), when the print job is output from the printer driver 32 to the print queue 301, the electronic tag application 33 acquires the print job from the print queue 301 (T16). The process of T16 is an example of a print data acquisition process.

Next, the electronic tag application 33 generates, based on a file name and page information extracted from the acquired print job, the document ID 183 and the page ID 184 as the printed material ID 17. Next, as shown in FIG. 1, two-dimensional barcode print data for printing the two-dimensional barcode 16 obtained by encoding the printed material ID 17 on the printing sheet 14 and printed material ID print data for printing the printed material ID 17 on the printing sheet 14 are generated, and then the two-dimensional barcode print data and the printed material ID print data are inserted into the print data of the acquired print job (T17). The process of T17 is an example of a generation process.

As described above, in the present embodiment, since the electronic tag application 33 resides in the PC 2, and the electronic tag application 33 acquires a print job output from the printer driver 32 to the print queue 301 before the print job is output to the printer 4, and controls the printer 4 to print images of printing sheet 14 pages, a two-dimensional barcode, and the printed material ID 17 code on the same printing sheet 14, it is not necessary to prepare a printer with special specifications for this system. Therefore, a general-purpose printer that is generally distributed may also be applied to the present system, and the applicability of the present system is improved, thereby improving the convenience.

In the present embodiment, the document ID 183 and the page ID 184 are generated in the process of T17, and the present invention is not limited thereto. For example, in the process of T17, the user ID 181 input at the time of installing the electronic tag application 33 may be acquired, the user ID 181 alone or in addition to the user ID 181, the document ID 183 and the page ID 184 may be used as the printed material ID 17, and the two-dimensional barcode print data for printing the two-dimensional barcode 16 obtained by the printed material ID 17 on the printing sheet 14 may be generated.

In the process of T17, a product name and a model number of the printer 4 may be acquired from the printer 4 and used as the printer ID, the printer ID alone or in addition to the printer ID, the document ID 183 and the page ID 184 may be used as the printed material ID 17, and the two-dimensional barcode print data for printing the two-dimensional barcode 16 obtained by the printed material ID 17 on the printing sheet 14 may be generated.

In the present embodiment, the two-dimensional barcode 16 is used as a code obtained by encoding the printed material ID 17, and the present invention is not limited thereto. For example, a one-dimensional barcode or a QR code may be used.

Next, the electronic tag application 33 activates the virtual driver 34 (T18). When the virtual driver 34 is activated, the virtual driver 34 transmits, to the printer 4, the print data generated by the electronic tag application 33, that is, the print job including the print data into which the two-dimensional barcode print data and the printed material ID print data are inserted, the print setting, and the like (T19). The process of T19 is an example of the printing process.

Next, the printer 4 that receives the print job performs printing on the printing sheet 14 to be printed based on the received print job (T20). As a result, as shown in FIG. 1, the image 15, the two-dimensional barcode 16, and the printed material ID 17 are printed on the printing sheet 14.

When the printing ends, the printer 4 transmits a printing end notification to the application 31 (T21). Accordingly, the employee (user) may recognize that the printing is ended via the operation display unit 26 of the PC 2.

The printer 4 transmits a printing completion notification to the electronic tag application 33 (T22). Then, the electronic tag application 33 that receives the printing completion notification generates the print log information 18 (T23), and then transmits the data of the generated print log information 18 to the cloud server 9 via the Internet line 12 (T24). The print log information 18 includes a record for each printed material printed in T20. The process of T24 is an example of a transmission process.

Next, the cloud server 9 that receives the data of the print log information 18 stores the received data of the print log information 18 in the storage unit 94 (T25). That is, the print log information 18 related to the printing sheet 14 (printed material) printed by the printer 4 this time is stored in the storage unit 94. The status of the disposal information 186 in the print log information 18 received this time is updated to "disposal not completed" (T26). The "disposal not completed" of the disposal information 186 is an example of the first data.

As described above, in the present embodiment, the printer 4 prints the image 15, the two-dimensional barcode 16, and the printed material ID 17 on the printing sheet 14. The electronic tag application 33 that receives the printing completion notification from the printer 4 after the printing is ended generates the print log information 18 and transmits the print log information 18 to the cloud server 9 via the Internet line 12. Since the cloud server 9 stores the received data of the print log information 18 in the storage unit 94 and updates the status of the disposal information 186 in the print log information 18 received this time to "disposal not completed", the cloud server 9 may appropriately manage whether disposal of the printing sheet 14 printed by the printer 4 is completed.

Next, in the present embodiment, a printed material printed by the printer 4 installed at a telework place, for example, at the home of an employee may include corporate confidentiality, and it is necessary to appropriately manage and dispose the printed material. For this purpose, the employee (user) stores the printing sheet 14 (printed material) in the bag 19 to which the electronic tag 11 is attached, and then carries the bag 19 to the office. Thereafter, the employee (user) takes out the printing sheet 14 (printed material) from the bag 19, and then shreds the printing sheet 14 by the shredding device 7.

The employee (user) activates the electronic tag application 33 before carrying out the printing sheet 14 (printed material) from home. Thereafter, it is necessary to connect the monitoring device 10 and the electronic tag 11 and store the user ID 181 in the electronic tag 11. When the monitoring device 10 and the electronic tag 11 are brought close to each other within a range of about 10 m to 20 m, the monitoring device 10 and the electronic tag 11 are communicably connected to each other. When the employee (user) inputs the user ID 181 via the user IF 107 of the monitoring device 10, the input user ID 181 is stored in the electronic tag 11. The user ID 181 input via the user IF 107 of the monitoring device 10 is also stored in the storage device 111. The user ID 181 stored in the storage device 111 is an example of specific information.

In the present embodiment, the user ID 181 is stored in the monitoring device 10, and the present invention is not limited thereto. For example, the monitoring device 10 may store the terminal ID 182, the printer ID of the printer 4 (for example, a product name or a model number acquired from the printer 4), the document ID 183, the printing date 185, and the like alone or in combination with the user ID 181. The printer ID of the printer 4 is acquired in the process of T16 described above.

Figure 8:
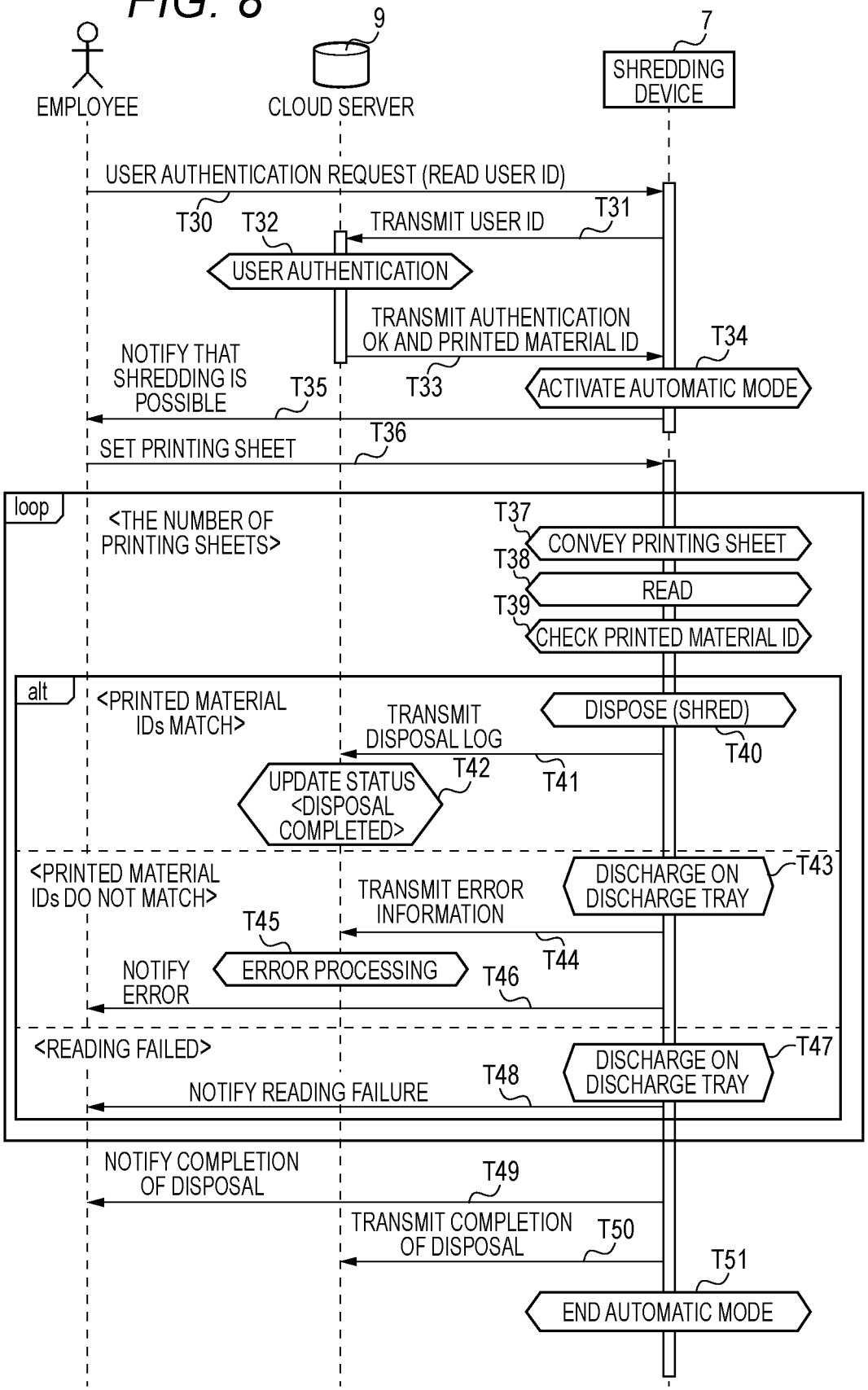
FIG. 8 is a sequence diagram showing a procedure of a shredding process in an automatic mode using a shredding device.

FIG. 8 is a sequence diagram showing a procedure of a shredding process in an automatic mode using a shredding device, which will be described in detail below with reference to the drawings. In the automatic mode, the shredding device 7 automatically reads the two-dimensional barcode 16 printed on the printing sheet 14 using the reading device 711, and then disposes (shreds) the printing sheet 14. Generally, when the shredding device 7 is turned on, the automatic mode is activated.

After turning on the shredding device 7, an employee (user) brings the monitoring device 10 close to the receiving unit 841 of the second communication interface 84 disposed on the upper surface of the housing 701 of the shredding device 7 (T30). Then, the CPU 72 of the shredding device 7 reads the user ID 181 stored in the monitoring device 10 via the receiving unit 841 and the second communication interface 84, and then stores the user ID 181 in the data storage unit 76 of the storage device 75. The user ID 181 read from the monitoring device 10 is an example of a first user ID.

Next, the shredding device 7 transmits the user ID 181 to the cloud server 9 via the first communication interface 77, the LAN 13, and the Internet line 12 (T31).

Next, the CPU 91 of the cloud server 9 that receives the user ID 181 via the network interface 95 determines whether the received user ID 181 is stored as the user ID 181 in the user IDs 181 in the print log information 18 stored in the storage unit 94, and executes user authentication (T32).

Next, when the received user ID 181 is stored in the print log information 18, the CPU 91 of the cloud server 9 reads, from the print log information 18 stored in the storage unit 94, the printed material ID 17 related to the received user ID 181, that is, the document ID 183 and the page ID 184, and then transmits authentication completion information and the document ID 183 and the page ID 184 as the printed material ID 17 to the shredding device 7 via the network interface 95 and the Internet line 12 (T33).

Next, the CPU 72 of the shredding device 7 that receives the printed material ID 17 and the authentication completion information stores the received authentication completion information, and the document ID 183 and the page ID 184 as the printed material ID 17 in the data storage unit 76 of the storage device 75, and activates the automatic mode (T34). Thereafter, the CPU 72 of the shredding device 7 notifies the employee (user) via the user interface 85 that shredding is possible in the automatic mode (T35). The notification may be a screen display using the display function of the user interface 85, a sound such as a buzzer sound, or a combination thereof.

As described above, in the present embodiment, since the employee (user) is notified of whether the automatic mode is set, that is, whether the user ID 181 stored in the monitoring device 10 is input via the receiving unit 841 and the second communication interface 84, via the user interface 85, the employee (user) may accurately grasp the mode of the shredding device 7, and the convenience is improved.

Next, the employee (user) who views the user interface 85 places the printing sheet 14 (printed material) taken out from the bag 19 on the placement portion 702 of the shredding device 7, and then presses a start button on the user interface 85 (T36).

Then, the CPU 72 of the shredding device 7 drives the conveying system motor 79 via the first motor controller 78 to rotate the pickup roller 709 and the retard roller 710. Then, the uppermost printing sheet 14 (printed material) placed on the placement portion 702 is conveyed toward the first conveying path 707 as the pickup roller 709 and the retard roller 710 rotate (T37).

At this time, the CPU 72 of the shredding device 7 reads the two-dimensional barcode 16 printed on the printing sheet 14 via the reading device 711 and acquires the printed material ID 17 printed on the printing sheet 14 (T38). The process of T38 is an example of a reading process.

In the present embodiment, after the printing sheet 14 (printed material) is placed on the placement portion 702, the printing sheet 14 (printed material) is conveyed by pressing the start button on the user interface 85, and the present invention is not limited thereto. For example, after placing the printing sheet 14 (printed material) on the placement portion 702, the employee (user) brings the monitoring device 10 close to the receiving unit 841. When the shredding device 7 reads the user ID 181 stored in the monitoring device 10, the printing sheet 14 (printed material) may be conveyed. In this case, the employee (user) may save the trouble of operating the start button on the user interface 85, which is convenient.

Next, the CPU 72 of the shredding device 7 checks whether the printed material ID 17 acquired via the reading device 711 is present in the printed material IDs 17 stored in the data storage unit 76 of the storage device 75 (T39).

In the present embodiment, in the process of T39, it is checked whether the printed material ID 17 acquired via the reading device 711, that is, the document ID 183 and the page ID 184 are present in the printed material IDs 17 stored in the data storage unit 76 of the storage device 75.

For example, in the process of T17 described above, when the user ID 181 is used alone as the printed material ID 17, or the document ID 183 and the page ID 184 are used as the printed material ID 17 in addition to the user ID 181, and the two-dimensional barcode 16 obtained by encoding the printed material ID 17 is printed on the printing sheet 14, in the process of T39, it may be checked whether the user ID 181 as the printed material ID 17 acquired via the reading device 711 matches the user ID 181 acquired in the process of T30. The user ID 181 as the printed material ID 17 acquired via the reading device 711 is an example of a second user ID.

In this case, it is determined whether a user ID of the printing sheet 14 (printed material) acquired via the reading device 711 is the same as a user ID received by a shredder, and if the user IDs are different from each other, the printing sheet 14 is not shredded, so that it is possible to prevent a printed material of another user from being shredded by mistake.

For example, in the process of T17 described above, when a printer ID is used alone as the printed material ID 17, or the document ID 183 and the page ID 184 are used as the printed material ID 17 in addition to the printer ID, and the two-dimensional barcode 16 obtained by encoding the printed material ID 17 is printed on the printing sheet 14, in the process of T39, it may be checked whether the printer ID as the printed material ID 17 acquired via the reading device 711 matches a printer ID acquired in the process of T30. The printer ID acquired in the process of T30 is an example of a first printer ID, and the printer ID acquired via the reading device 711 is an example of a second printer ID. In this case, the monitoring device 10 needs to store the printer ID of the printer 4 in addition to the user ID 181.

In this case, it is determined whether a printer ID of a printed material is the same as a printer ID received by a shredder, and if the printer IDs are different from each other, the printed material is not shredded, so that it is possible to prevent a printed material printed by another printer from being shredded by mistake.

Next, if the printed material ID 17 acquired via the reading device 711 is present in the printed material IDs 17 stored in the data storage unit 76 of the storage device 75, the CPU 72 of the shredding device 7 drives the conveying system motor 79 via the first motor controller 78 to rotate the first conveying rollers 708. Therefore, the printing sheet 14 is further conveyed through the first conveying path 707 as the first conveying rollers 708 rotate. At this time, since the switching blade 712 is positioned as shown in FIG. 4, the printing sheet 14 conveyed through the first conveying path 707 is conveyed toward the shredding portion 703.

At this time, the CPU 72 of the shredding device 7 drives the cutter motor 81 via the second motor controller 80 to rotate the cutters of the shredding portion 703, and the printing sheet 14 conveyed through the first conveying path 707 is shredded in the shredding portion 703 and accumulated in the storage tray 704 (T40). The process of T40 is an example of the shredding process.

Next, the CPU 72 of the shredding device 7 transmits disposal log information to the cloud server 9 via the first communication interface 77, the LAN 13, and the Internet line 12. Specifically, the shredding device 7 transmits the printed material ID 17 of the printing sheet 14 shredded by the shredding portion 703 to the cloud server 9 as the disposal log information (T41). In the present embodiment, the disposal log information includes the printed material ID 17 acquired via the reading device 711 and the disposal date 187. The process of T41 is an example of the rewriting process.

The cloud server 9 that receives the disposal log information changes, in the print log information 18 stored in the storage unit 94, the disposal information 186 in the print log information 18 that matches the printed material ID 17 included in the disposal log information from "disposal not completed" to "disposal completed", and updates the disposal date 187 (T42). The processes of T41 and T42 are an example of a rewriting process. In addition, "disposal completed" of the disposal information 186 is an example of second data.

If the printed material ID 17 acquired via the reading device 711 does not exist in the printed material IDs 17 stored in the data storage unit 76 of the storage device 75, the CPU 72 of the shredding device 7 drives the conveying system motor 79 via the first motor controller 78 to rotate the first conveying rollers 708. Therefore, the printing sheet 14 is further conveyed through the first conveying path 707 as the first conveying rollers 708 rotate. At this time, the CPU 72 of the shredding device 7 drives the switching motor 83 via the third motor controller 82 to rotate the switching blade 712 in the clockwise direction. As a result, the printing sheet 14 conveyed through the first conveying path 707 is conveyed toward the second conveying path 717 in the middle.

Further, the CPU 72 of the shredding device 7 drives the conveying system motor 79 via the first motor controller 78 to rotate the second conveying rollers 718. Therefore, the printing sheet 14 guided to the second conveying path 717 by the switching blade 712 is further conveyed through the second conveying path 717 as the second conveying rollers 718 rotate, and then the printing sheet 14 is discharged on the discharge tray 714 from the discharge port 713 (T43).

Next, the CPU 72 of the shredding device 7 transmits error report information to the cloud server 9 via the first communication interface 77, the LAN 13, and the Internet line 12. Specifically, the shredding device 7 transmits the printed material ID 17 of the printing sheet 14 that does not exist in the printed material IDs 17 stored in the data storage unit 76 of the storage device 75 to the cloud server 9 as the error report information (T44).

The cloud server 9 that receives the error report information stores the error report information in the storage unit 94 (T45).

Next, the CPU 72 of the shredding device 7 notifies the employee (user) via the user interface 85 that the printed material ID 17 does not match. That is, the CPU 72 notifies that a printed material printed by another person is mixed in the printing sheet 14 (printed material) placed on the placement portion 702 of the shredding device 7 (T46).

When the reading device 711 fails to read the two-dimensional barcode 16 printed on the printing sheet 14, the CPU 72 of the shredding device 7 drives the conveying system motor 79 via the first motor controller 78 to rotate the first conveying rollers 708. Therefore, the printing sheet 14 is further conveyed through the first conveying path 707 as the first conveying rollers 708 rotate. At this time, the CPU 72 of the shredding device 7 drives the switching motor 83 via the third motor controller 82 to rotate the switching blade 712 in the clockwise direction. As a result, the printing sheet 14 conveyed through the first conveying path 707 is conveyed toward the second conveying path 717 in the middle.

Further, the CPU 72 of the shredding device 7 drives the conveying system motor 79 via the first motor controller 78 to rotate the second conveying rollers 718. Therefore, the printing sheet 14 guided to the second conveying path 717 by the switching blade 712 is further conveyed through the second conveying path 717 as the second conveying rollers 718 rotate, and then the printing sheet 14 is discharged on the discharge tray 714 from the discharge port 713 (T47).

As described above, in the present embodiment, when the printed material ID 17 acquired via the reading device 711 does not exist in the printed material IDs 17 stored in the data storage unit 76 of the storage device 75, the printing sheet 14 is discharged from the discharge port 713 on the discharge tray 714, and therefore, the employee (user) may easily take out a printed material printed by another person, which is convenient.

Next, the CPU 72 of the shredding device 7 notifies the employee (user) via the user interface 85 that the reading device 711 fails to read the two-dimensional barcode 16 printed on the printing sheet 14 (T48).

The shredding device 7 repeats the processes of T37 to T48 described above until all the printing sheets 14 placed on the placement portion 702 of the shredding device 7 are conveyed.

When the employee (user) places the printing sheet 14 discharged on the discharge tray 714 on the placement portion 702 of the shredding device 7 again, the shredding device 7 of the present embodiment shifts to a retry mode and repeats the processes of T37 to T48 described above. In the retry mode, in the process of T37 or the like, the CPU 72 of the shredding device 7 may control a rotation speed of the conveying system motor 79 to be slower via the first motor controller 78, and may set a conveying speed of the printing sheet 14 (printed material) to be slower than a conveying speed of the printing sheet 14 (printed material) in the first time (not in the retry mode). The conveying speed of the printing sheet 14 (printed material) in the retry mode is an example of a second speed, and the conveying speed of the printing sheet 14 (printed material) in the first time is an example of a first speed.

As described above, in the present embodiment, in the reading in the retry mode after the code reading fails, the printing sheet 14 (printed material) is conveyed at a low speed, and the possibility of succeeding in the reading of the two-dimensional barcode 16 in the process of T38 is increased as compared with the case of not being in the retry mode, thereby increasing the possibility of managing whether the printing sheet 14 (printed material) from which the two-dimensional barcode 16 is difficult to read is disposed.

The retry mode may be manually cancelled as in a case in which a user inputs a cancellation instruction, or may be automatically cancelled in a case in which the reading of the code is succeed, in a case in which a predetermined number of printed materials are conveyed, in a case in which a timeout occurs due to no operation, or the like.

Next, when it is detected that all the printing sheets 14 placed on the placement portion 702 of the shredding device 7 are conveyed, that is, when it is detected by a sheet sensor (not shown) or the like that the placement portion 702 of the shredding device 7 has no printing sheets 14 placed thereon, the shredding device 7 notifies the employee (user) of the completion of disposal via the user interface 85 (T49). The shredding device 7 transmits disposal completion information to the cloud server 9 via the first communication interface 77, the LAN 13, and the Internet line 12 (T50). Thereafter, the shredding device 7 ends the automatic mode (T51).

In the present embodiment, the automatic mode is ended (T51) when it is detected that all the printing sheets 14 placed on the placement portion 702 of the shredding device 7 are conveyed, and the present invention is not limited thereto. For example, the automatic mode may be ended (T51) when a period during which the printing sheet 14 is not conveyed exceeds a threshold time. In either case, since the automatic mode is automatically ended, the shredding device 7 is convenient for an employee (user) who wants to use the shredding device 7 as a simple shredder.

Figure 9:
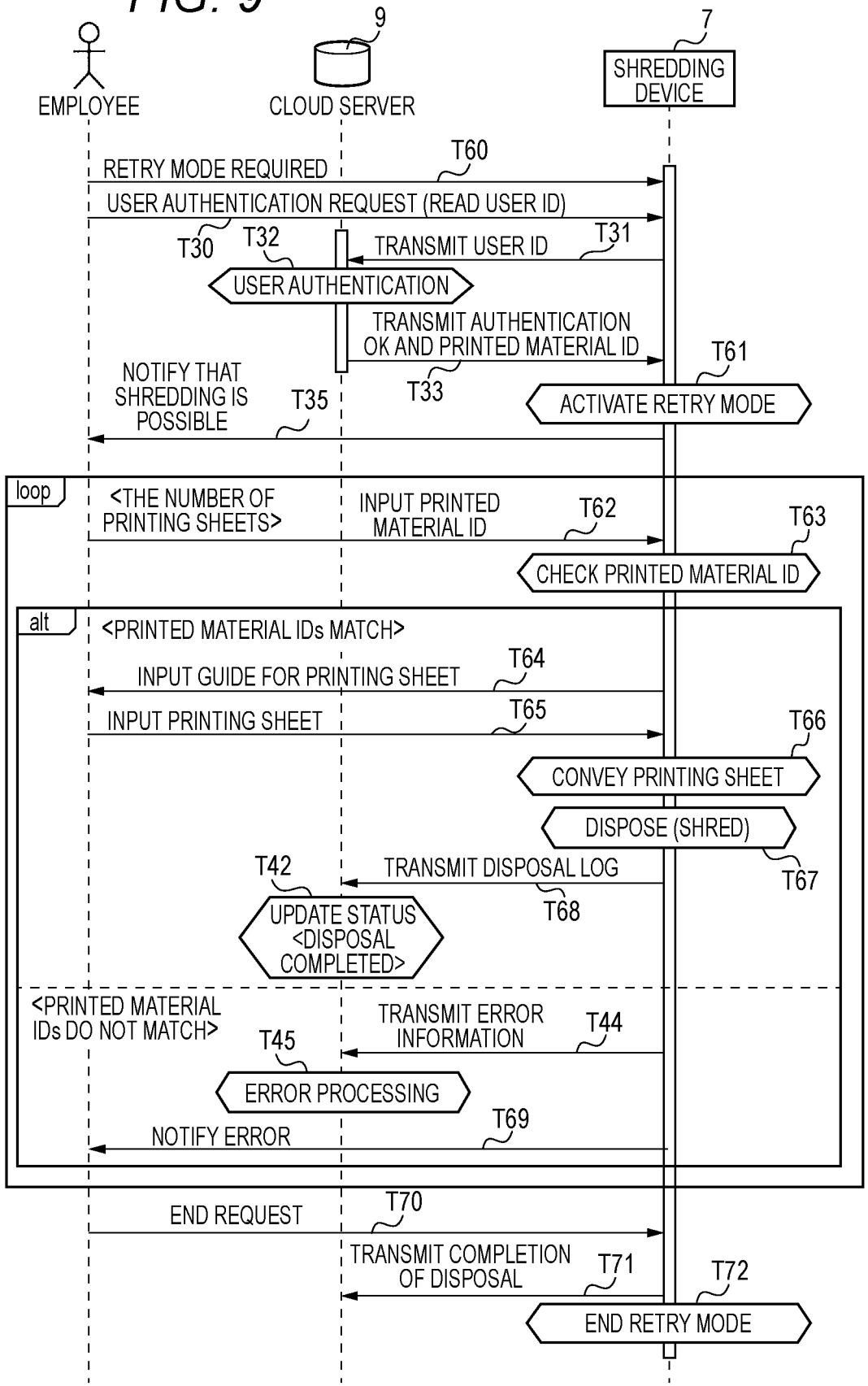
FIG. 9 is a sequence diagram showing a procedure of a shredding process in a retry mode using a shredding device.

Next, a retry mode in which an employee (user) manually inputs the printed material ID 17 of the printing sheet 14 for which the reading of the two-dimensional barcode 16 is failed via the user interface 85 in the shredding device 7 will be described. FIG. 9 is a sequence diagram showing a procedure of a shredding process in the retry mode using a shredding device, which will be described in detail below with reference to the drawings. In the description, the same processes as those in the automatic mode are denoted by the same reference numerals. The retry mode is an example of a manual mode.

An employee (user) sets the retry mode via the user interface 85 (T60).

Then, the shredding device 7 is activated in the retry mode after the user authentication (T61).

Next, after it is notified via the user interface 85 that shredding is possible (T35), a screen for requesting input of the printed material ID is displayed on the user interface 85, and the employee (user) inputs the printed material ID 17 printed on the printing sheet 14 via the user interface 85 (T62).

Next, the CPU 72 of the shredding device 7 checks whether the printed material ID 17 input via the user interface 85 is present in the printed material IDs 17 stored in the data storage unit 76 of the storage device 75 (T63).

If the input printed material ID 17 is present in the printed material IDs 17 stored in the data storage unit 76 of the storage device 75, the CPU 72 of the shredding device 7 guides the employee (user) to place the printing sheet 14 corresponding to the input printed material ID on the placement portion 702 via the user interface 85 (T64).

The employee (user) who sees the guidance of the user interface 85 places one printing sheet 14 corresponding to the input printed material ID on the placement portion 702 (T65).

Next, the CPU 72 of the shredding device 7 that detects that the one printing sheet 14 is placed on the placement portion 702 drives the conveying system motor 79 via the first motor controller 78 to rotate the pickup roller 709, the retard roller 710, and the first conveying rollers 708. Therefore, the printing sheet 14 is further conveyed through the first conveying path 707 as the pickup roller 709, the retard roller 710, and the first conveying rollers 708 rotate. At this time, since the switching blade 712 is positioned as shown in FIG. 4, the printing sheet 14 conveyed through the first conveying path 707 is conveyed toward the shredding portion 703 (T66).

At this time, the CPU 72 of the shredding device 7 drives the cutter motor 81 via the second motor controller 80 to rotate the cutters of the shredding portion 703, and the printing sheet 14 conveyed through the first conveying path 707 is shredded in the shredding portion 703 and accumulated in the storage tray 704 (T67). This process is an example of a special shredding process.

Next, the CPU 72 of the shredding device 7 transmits disposal log information to the cloud server 9 via the first communication interface 77, the LAN 13, and the Internet line 12. Specifically, the shredding device 7 transmits the printed material ID 17 of the printing sheet 14 shredded by the shredding portion 703 to the cloud server 9 as the disposal log information (T68). In the present embodiment, the disposal log information includes the printed material ID 17 input via the user interface 85 and the disposal date 187. The cloud server 9 that receives the disposal log information changes, in the print log information 18 stored in the storage unit 94, the disposal information 186 in the print log information 18 that matches the printed material ID 17 included in the disposal log information from "disposal not completed" to "disposal completed", and updates the disposal date 187 (T42). The process of T68 is an example of a special rewriting process.

On the other hand, if the input printed material ID 17 does not exist in the printed material IDs 17 stored in the data storage unit 76 of the storage device 75, the CPU 72 of the shredding device 7 transmits error report information to the cloud server 9 (T44). The cloud server 9 that receives the error report information stores the error report information in the storage unit 94 (T45). The CPU 72 of the shredding device 7 notifies the employee (user) via the user interface 85 that the printed material ID 17 does not match. That is, the CPU 72 notifies that a printed material printed by another person is mixed in the printing sheet 14 (printed material) placed on the placement portion 702 of the shredding device 7. Further, the CPU 72 of the shredding device 7 guides the employee (user) via the user interface 85 so as not to place the printing sheet 14 on the placement portion 702 (T69).

The shredding device 7 repeats the processes from T63 described above each time the employee (user) inputs the printed material ID 17 printed on the printing sheet 14 via the user interface 85 (T62).

When the employee (user) inputs an end request via the user interface 85 (T70), the shredding device 7 transmits the disposal completion information to the cloud server 9 via the first communication interface 77, the LAN 13, and the Internet line 12 (T71). Thereafter, the shredding device 7 ends the retry mode (T72).

As described above, in the present embodiment, an input of a printed material ID is received after the reading of the two-dimensional barcode 16 fails, the input printed material ID 17 is transmitted to the cloud server 9, the cloud server 9 changes the disposal information 186 included in the print log information 18 corresponding to the printed material ID 17 from "disposal not completed" to "disposal completed" and updates the disposal date 187, and the printing sheet 14 (printed material) is shredded, so that the cloud server 9 may appropriately manage whether disposal of the printing sheet 14 (printed material) from which the code cannot be read is completed.

In the present embodiment, the retry mode is ended by an employee (user) inputting an end request via the user interface 85, and the retry mode may be automatically switched, for example, when shredding is completed or timeout occurs due to no operation.

In the present embodiment, the retry mode is set via the user interface 85 after an employee (user) turns on the shredding device 7, and it may be automatically switched to the retry mode, for example, if the previous retry mode consecutively fails a predetermined number of times. In this case, it is possible to reduce the chances for the employee (user) to input the printed material ID 17.

As described above in detail, if the shredding device 7 succeeds in reading the two-dimensional barcode 16 of the printing sheet 14, the shredding device 7 transmits the printed material ID 17 indicated by the read two-dimensional barcode 16 to the cloud server 9 in addition to shredding the printing sheet 14, and the cloud server 9 rewrites the disposal information 186 included in the print log information 18 corresponding to the printed material ID 17 from "disposal not completed" to "disposal completed", so that the cloud server 9 may manage whether disposal of the printing sheet 14 corresponding to the printed material ID 17 is completed. On the other hand, if the reading of the two-dimensional barcode 16 of the printing sheet 14 fails, the print log information 18 is not rewritten and the printing sheet 14 is discharged to the outside of the device without being shredded, so that the reliability of the print log information 18 is not reduced and the printing sheet 14 may be reliably managed.

Figure 10:
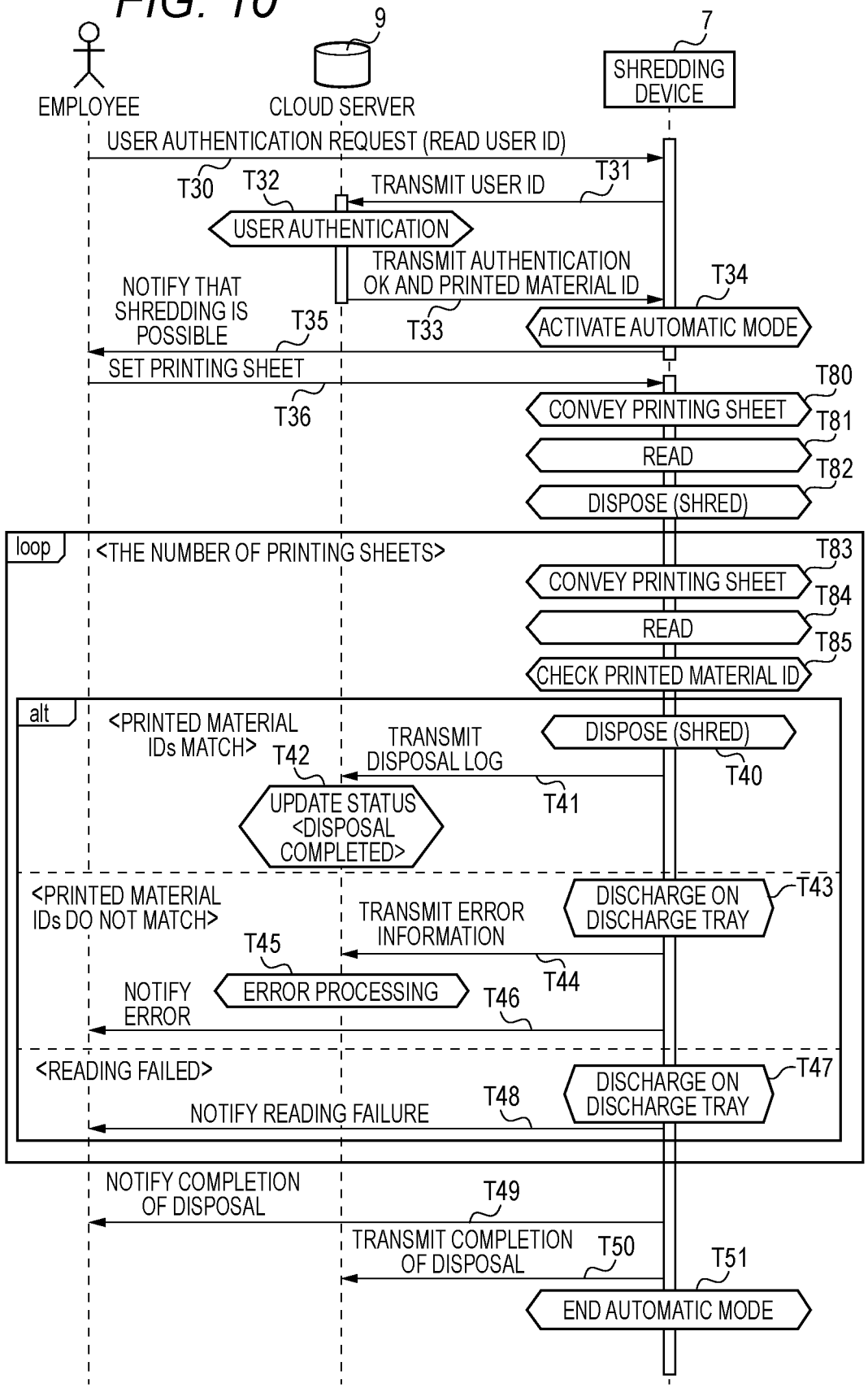
FIG. 10 is a sequence diagram showing a procedure of a shredding process in an automatic mode using a shredding device.

FIG. 10 is a sequence diagram showing a procedure of a shredding process in an automatic mode using a shredding device according to a second embodiment, which will be described in detail below with reference to the drawings. In the description, the same processes as those in the first embodiment are denoted by the same reference numerals.

In the second embodiment, first, in the process of T17 shown in FIG. 7, a case will be described in which the user ID 181 is used alone as the printed material ID 17, or the document ID 183 and the page ID 184 are used as the printed material ID 17 in addition to the user ID 181, and the two-dimensional barcode 16 obtained by encoding the printed material ID 17 is printed on the printing sheet 14.

In FIG. 10, the CPU 72 of the shredding device 7 drives the conveying system motor 79 via the first motor controller 78 to rotate the pickup roller 709 and the retard roller 710. Then, the uppermost printing sheet 14 (printed material) placed on the placement portion 702, that is, the leading printing sheet 14 is conveyed toward the first conveying path 707 as the pickup roller 709 and the retard roller 710 rotate (T80).

At this time, the CPU 72 of the shredding device 7 reads the two-dimensional barcode 16 printed on the printing sheet 14 via the reading device 711 to acquire the printed material ID 17 printed on the leading printing sheet 14, and then stores the acquired printed material ID 17 in the data storage unit 76 of the storage device 75 (T81).

Next, the CPU 72 of the shredding device 7 drives the cutter motor 81 via the second motor controller 80 to rotate cutters of the shredding portion 703, shreds the leading printing sheet 14 (printed material) conveyed through the first conveying path 707 in the shredding portion 703, and accumulates the shredded printing sheet 14 in the storage tray 704 (T82).

Next, the CPU 72 of the shredding device 7 drives the conveying system motor 79 via the first motor controller 78 to rotate the pickup roller 709 and the retard roller 710. Then, the next (subsequent) printing sheet 14 (printed material) placed on the placement portion 702 is conveyed toward the first conveying path 707 as the pickup roller 709 and the retard roller 710 rotate (T83).

At this time, the CPU 72 of the shredding device 7 reads the two-dimensional barcode 16 printed on the next (subsequent) printing sheet 14 via the reading device 711, and acquires the printed material ID 17 printed on the next (subsequent) printing sheet 14 (T84). The process of T84 is an example of a reading process.

Next, the CPU 72 of the shredding device 7 checks whether the next (subsequent) printed material ID 17 acquired via the reading device 711, that is, the user ID 181, is the same as the printed material ID 17 stored in the data storage unit 76 of the storage device 75 in the process of T81, that is, the user ID 181 printed on the leading printing sheet 14 (T85).

If the user IDs 181 match each other, the printing sheet 14 (printed material) is shredded by the shredding portion 703 in the process of T40. If the user IDs 181 do not match each other, the printing sheet 14 (printed material) is discharged from the discharge port 713 on the discharge tray 714 in the process of T43. If the two-dimensional barcode 16 printed on the printing sheet 14 cannot be read by the reading device 711, the printing sheet 14 is discharged from the discharge port 713 on the discharge tray 714. In the process of T81, the user ID 181 as the printed material ID 17, which is printed on the leading printing sheet 14 and acquired via the reading device 711, is an example of a first user ID. In the process of T84, the user ID 181 as the printed material ID 17, which is printed on the next (subsequent) printing sheet 14 and acquired via the reading device 711, is an example of a second user ID.

In this case, when there is a printing sheet 14 (subsequent printed material) having a user ID different from that of a printing sheet 14 (leading printed material) conveyed first among a plurality of printing sheets 14 (printed materials), it is highly likely that the subsequent printed material belongs to a user different from the leading printed material, and it is unknown whether the subsequent printed material is to be disposed, and therefore, by discharging the subsequent printed material to the outside of the device without rewriting a print log and without shredding the subsequent printed material, it is possible to ensure the safety of the subsequent printed material and the print log.

Next, in the second embodiment, in the process of T17 shown in FIG. 7, a case will be described in which a printer ID is used alone as the printed material ID 17, or the document ID 183 and the page ID 184 are used as the printed material ID 17 in addition to the printer ID, and the two-dimensional barcode 16 obtained by encoding the printed material ID 17 is printed on the printing sheet 14. In the description, when the description is the same as that of the user ID 181 described above, the description thereof will be omitted.

In FIG. 10, in the process of T80, the CPU 72 of the shredding device 7 conveys the uppermost printing sheet 14 (printed material) placed on the placement portion 702, that is, the leading printing sheet 14 toward the first conveying path 707.

At this time, the CPU 72 of the shredding device 7 reads the two-dimensional barcode 16 printed on the printing sheet 14 via the reading device 711 to acquire the printed material ID 17 printed on the leading printing sheet 14, and then stores the acquired printed material ID 17 in the data storage unit 76 of the storage device 75 (T81).

Next, in the process of T83, the CPU 72 of the shredding device 7 conveys the next (subsequent) printing sheet 14 (printed material) placed on the placement portion 702 toward the first conveying path 707.

At this time, the CPU 72 of the shredding device 7 reads the two-dimensional barcode 16 printed on the next (subsequent) printing sheet 14 via the reading device 711, and acquires the printed material ID 17 printed on the next (subsequent) printing sheet 14 (T84). The process of T84 is an example of the reading process.

Next, the CPU 72 of the shredding device 7 checks whether the next (subsequent) printed material ID 17 acquired via the reading device 711, that is, a printer ID, is the same as the printed material ID 17 stored in the data storage unit 76 of the storage device 75 in the process of T81, that is, a printer ID printed on the leading printing sheet 14 (T85).

If the printer IDs match each other, the printing sheet 14 (printed material) is shredded by the shredding portion 703 in the process of T40. If the printer IDs do not match each other, the printing sheet 14 (printed material) is discharged from the discharge port 713 on the discharge tray 714 in the process of T43. If the two-dimensional barcode 16 printed on the printing sheet 14 cannot be read by the reading device 711, the printing sheet 14 is discharged from the discharge port 713 on the discharge tray 714. In the process of T81, the printer ID as the printed material ID 17, which is printed on the leading printing sheet 14 and acquired via the reading device 711, is an example of a first printer ID. In the process of T84, the printer ID as the printed material ID 17, which is printed on the next (subsequent) printing sheet 14 and acquired via the reading device 711, is an example of a second printer ID.

In this case, when there is a printing sheet 14 (subsequent printed material) having a printer ID different from that of a printing sheet 14 (leading printed material) conveyed first among a plurality of printing sheets 14 (printed materials), it is highly likely that the subsequent printed material belongs to a user different from the leading printed material, and it is unknown whether the subsequent printed material is to be disposed, and therefore, by discharging the subsequent printed material to the outside of the device without rewriting a print log and without shredding the subsequent printed material, it is possible to ensure the safety of the subsequent printed material and the print log.

The present embodiment is merely an example and does not limit the present invention in any way. Therefore, as a matter of course, the present invention may be improved and modified in various ways without departing from the gist thereof. For example, the PC 2 is not limited to the storage device 24, and may include any type of mass storage device.

The communication method between the PC 2 and the printer 4 is not limited to wired communication using a USB cable. For example, wireless communication conforming to a Wi-Fi standard may be used, or wireless communication based on another standard such as Bluetooth may be used. In addition, a plurality of communication functions may be provided.

The two-dimensional barcode 16 and the printed material ID 17 may be included in a header or footer of the printing sheet 14, or may be combined with an image on a page to be printed.

Either the rewriting process (T41) of transmitting the printed material ID 17 to the cloud server 9 as disposal log information or the shredding process (T40) may be performed first, or may be performed simultaneously. Either the special rewriting process (T68) or the shredding process (T67) may be performed first, or may be performed simultaneously.

The user ID 181 may be input to the shredding device 7 by an employee (user) via the user interface 85 of the shredding device 7 without using the monitoring device 10. If the user ID 181 is input from the monitoring device 10, the employee (user) may save the trouble of inputting the user ID 181.

The user ID 181 is input to the shredding device 7 using the monitoring device 10 and may also be input using the electronic tag 11. In this case, the electronic tag 11 is an example of a portable device.

The processes disclosed in the embodiments may be executed by hardware such as a single CPU, a plurality of CPUs, or an ASIC, or a combination thereof. In addition, the processes disclosed in the embodiments may be implemented in various aspects such as a recording medium in which a program for executing the processes is recorded, a method, or the like.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure.

What is claimed is:

1. A printed material management system comprising:
   a non-transitory computer readable medium storing a management program;
   a server; and
   a shredder,
   wherein the management program is configured to cause a controller of a device in which the management program is installed to execute:
      a print data acquisition process of acquiring print data,
      a generation process of determining a printed material ID for each page to be printed based on the print data acquired in the print data acquisition process, and generating a code by encoding the determined printed material ID,
      a printing process of printing the code generated in the generation process and an image on a page corresponding to the printed material ID encoded in the code on the same sheet using a printer, and
      a transmission process of transmitting, to the server, a print log including the printed material ID and first data indicating that disposal is not completed,
   wherein the print log transmitted by the management program is stored in the server,
   wherein the shredder includes an inlet, a cutter, and a scanner, and
   wherein the shredder is configured to convey a printed material input from the inlet and execute a reading process of reading the code printed on the printed material using the scanner,
   wherein, in a case where the code is successfully read in the reading process, the shredder is configured to execute:
      a rewriting process of transmitting a rewriting request associated with the printed material ID encoded in the code read in the reading process to the server, and causing the server to rewrite the first data included in the print log corresponding to the printed material ID associated with the rewriting request among print logs stored in the server to second data indicating that disposal is completed; and
      a shredding process of shredding the printed material, which is read in the reading process, using the cutter, and
   wherein, in a case where the code is not successfully read in the reading process, the shredder is configured to execute:
      a discharge process of discharging the printed material subjected to the reading process to the outside of the device without executing the rewriting process and the shredding process and shredding the printed material,
   wherein the management program is configured to, in the generation process:
      acquire a user ID;
      determine the printed material ID including the acquired user ID for each page to be printed based on the print data acquired in the print data acquisition process; and
      generate the code by encoding the determined printed material ID, and
   wherein the shredder is configured to continuously convey a plurality of printed materials one by one,
   wherein the shredder is configured to, in a case where the shredder reads the code from a leading printed material which is a printed material conveyed first among the plurality of printed materials in the reading process, execute a storage process of storing, in a memory, a leading user ID that is a user ID included in the printed material ID encoded in the read code, and
   wherein the shredder is configured to, in a case where the shredder reads the code from a subsequent printed material which is a printed material conveyed after the leading printed material among the plurality of printed materials in the reading process and the user ID included in the printed material ID encoded in the read code matches the leading user ID, execute the rewriting process and the shredding process on the subsequent printed material, and
   wherein the shredder is configured to, in a case where the shredder reads the code from the subsequent printed material in the reading process and the user ID included in the printed material ID encoded in the read code does not match the leading user ID, execute the discharge process on the subsequent printed material without executing the rewriting process and the shredding process on the subsequent printed material.

2. The printed material management system according to claim 1,
   wherein the management program is configured to, in the generation process:
      acquire a printer ID for identifying the printer;
      determine the printed material ID including the acquired printer ID for each page to be printed based on the print data acquired in the print data acquisition process; and
      generate the code by encoding the determined printed material ID, and
   wherein the shredder is configured to continuously conveying a plurality of printed materials one by one,
   wherein the shredder is configured to, in a case where the shredder reads the code from a leading printed material which is a printed material conveyed first among the plurality of printed materials in the reading process, execute a storage process of storing, in a memory, a leading printer ID that is a printer ID included in the printed material ID encoded in the read code, and
   wherein the shredder is configured to, in a case where the shredder reads the code from a subsequent printed material which is a printed material conveyed after the leading printed material among the plurality of printed materials in the reading process and the printer ID included in the printed material ID encoded in the read code matches the leading printer ID, execute the rewriting process and the shredding process on the subsequent printed material, and wherein the shredder is configured to, in a case where the shredder reads the code from a subsequent printed material which is a printed material conveyed after the leading printed material among the plurality of printed materials in the reading process and the printer ID included in the printed material ID encoded in the read code does not matches the leading printer ID, execute the discharge process on the subsequent printed material without executing the rewriting process and the shredding process on the subsequent printed material.

3. The printed material management system according to claim 1, wherein the management program is configured to, in the generation process:

acquire a first user ID;

determine the printed material ID including the acquired first user ID for each page to be printed based on the print data acquired in the print data acquisition process; and generate the code by encoding the determined printed material ID, wherein the shredder includes an input interface and configured to receive an input of a second user ID via the input interface, wherein the shredder is configured to, in a case where the shredder successfully reads the code in the reading process, determine whether the first user ID matches the second user ID, wherein the shredder is configured to, in a case where the first user ID matches the second user ID, execute the rewriting process and the shredding process, and wherein the shredder is configured to, in a case where the first user ID does not match the second user ID, execute the discharge process without executing the rewriting process and the shredding process.

4. The printed material management system according to claim 1, wherein the management program is configured to, in the generation process:

acquire a first printer ID;

determine the printed material ID including the acquired first printer ID for each page to be printed based on the print data acquired in the print data acquisition process; and generate the code by encoding the determined printed material ID, wherein the shredder includes an input interface and configured to receive an input of a second printer ID via the input interface, wherein the shredder is configured to, in a case where the shredder successfully reads the code in the reading process, determine whether the first printer ID matches the second printer ID, wherein the shredder is configured to, in a case where the first printer ID matches the second printer ID, execute the rewriting process and the shredding process, and wherein the shredder is configured to, in a case where the first printer ID does not match the second printer ID, execute the discharge process without executing the rewriting process and the shredding process.

5. The printed material management system according to claim 1, wherein the device in which the management program is installed is an information processing device, and wherein, in the print data acquisition process, the management program monitors a print queue of the information processing device and acquires the print data input to the print queue before the print data is output to the printer.

6. A shredder comprising:

an inlet;

a cutter; and a scanner, wherein the shredder is configured to execute a reading process of conveying a printed material input from the inlet and reading a code printed on the printed material by using the scanner, wherein the code is generated by a management program installed in a device different from the shredder, wherein the management program is configured to:

determine a printed material ID for each page to be printed;

generate the code by encoding the determined printed material ID;

cause a printer to print the generated code and an image on a page corresponding to the printed material ID encoded in the code on the same sheet; and transmit a print log including the printed material ID and first data indicating that disposal is not completed to a server, wherein the transmitted print log is stored in the server, and wherein the shredder is configured to execute, in a case where the shredder successfully reads the code in the reading process:

a rewriting process of transmitting a rewriting request associated with the printed material ID encoded in the code read in the reading process to the server, and causing the server to rewrite the first data included in the print log corresponding to the printed material ID associated with the rewriting request among print logs stored in the server to second data indicating that disposal is completed, and a shredding process of shredding, using the cutter, the printed material subjected to the reading process, and wherein the shredder is configured to execute, in a case where the shredder does not successfully read the code in the reading process:

a discharge process of discharging the printed material subjected to the reading process, to the outside of the device without shredding the printed material instead of the rewriting process and the shredding process, and wherein the shredder is configured to, in a case where the shredder does not successfully read the code in the reading process:

execute the discharge process without executing the rewriting process and the shredding process; and shifts to a retry mode, and the shredder is configured to convey the printed material input from the inlet at a first speed in the reading process and a mode different from the retry mode, and the shredder is configured to convey the printed material input from the inlet at a second speed lower than the first speed in the reading process and the retry mode.

7. The shredder according to claim 6, wherein the shredder includes an input interface and configured to execute, in a case where the shredder does not successfully read the code in the reading process, the discharge process without executing the rewriting process and the shredding process and then shift to a manual mode, the shredder is configured not to execute the reading process in the manual mode, and the shredder is further configured to, in the manual mode:
receive an input of a printed material ID via the input interface,
after the printed material ID is input, transmit a special rewriting request associated with the input printed material ID to the server, and execute a special rewriting process of causing the server to rewrite the first data included in the print log corresponding to the printed material ID associated with the special rewriting request among print logs stored in the server to the second data, and
execute a special shredding process of shredding the printed material input from the inlet using the cutter in a case where the print log corresponding to the input printed material ID is stored in the server.

8. The shredder according to claim 7,
wherein the shredder is configured to, in a case where the shredder does not successfully read the code in the reading process:
execute the discharge processing without executing the rewriting process and the shredding process;
continuously count the number of times the reading of the code fails in the reading process; and
shift to the manual mode when the number of times exceeds a predetermined number of times, and
wherein the shredder is configured to reset the number of times in a case where the shredder successfully reads the code in the reading process.

9. The shredder according to claim 7,
wherein the input interface includes a wireless communication interface configured to communicate with an electronic tag which is configured to store the printed material ID, and
wherein the shredder is configured to communicate with the electronic tag via the wireless communication interface, and receive the printed material ID from the electronic tag as an input of the printed material ID.

10. A printed material management system comprising:
a non-transitory computer readable medium storing a management program;
a server; and
a shredder,
wherein the management program is configured to cause a controller of a device in which the management program is installed to execute:
a print data acquisition process of acquiring print data,
a generation process of determining a printed material ID for each page to be printed based on the print data acquired in the print data acquisition process, and generating a code by encoding the determined printed material ID,
a printing process of printing the code generated in the generation process and an image on a page corresponding to the printed material ID encoded in the code on the same sheet using a printer, and
a transmission process of transmitting, to the server, a print log including the printed material ID and first data indicating that disposal is not completed,
wherein the print log transmitted by the management program is stored in the server,
wherein the shredder includes an inlet, a cutter, and a scanner, and
wherein the shredder is configured to convey a printed material input from the inlet and execute a reading process of reading the code printed on the printed material using the scanner,
wherein, in a case where the code is successfully read in the reading process, the shredder is configured to execute:
a rewriting process of transmitting a rewriting request associated with the printed material ID encoded in the code read in the reading process to the server, and causing the server to rewrite the first data included in the print log corresponding to the printed material ID associated with the rewriting request among print logs stored in the server to second data indicating that disposal is completed; and
a shredding process of shredding the printed material, which is read in the reading process, using the cutter, and
wherein, in a case where the code is not successfully read in the reading process, the shredder is configured to execute:
a discharge process of discharging the printed material subjected to the reading process to the outside of the device without executing the rewriting process and the shredding process and shredding the printed material, and
wherein the management program is configured to, in the generation process:
acquire a printer ID for identifying the printer;
determine the printed material ID including the acquired printer ID for each page to be printed based on the print data acquired in the print data acquisition process; and
generate the code by encoding the determined printed material ID, and
wherein the shredder is configured to continuously conveying a plurality of printed materials one by one,
wherein the shredder is configured to, in a case where the shredder reads the code from a leading printed material which is a printed material conveyed first among the plurality of printed materials in the reading process, execute a storage process of storing, in a memory, a leading printer ID that is a printer ID included in the printed material ID encoded in the read code, and
wherein the shredder is configured to, in a case where the shredder reads the code from a subsequent printed material which is a printed material conveyed after the leading printed material among the plurality of printed materials in the reading process and the printer ID included in the printed material ID encoded in the read code matches the leading printer ID, execute the rewriting process and the shredding process on the subsequent printed material, and
wherein the shredder is configured to, in a case where the shredder reads the code from a subsequent printed material which is a printed material conveyed after the leading printed material among the plurality of printed materials in the reading process and the printer ID included in the printed material ID encoded in the read code does not matches the leading printer ID, execute the discharge process on the subsequent printed material without executing the rewriting process and the shredding process on the subsequent printed material.

11. The printed material management system according to claim 10,
wherein the management program is configured to, in the generation process:
acquire a first user ID;
determine the printed material ID including the acquired first user ID for each page to be printed based on the print data acquired in the print data acquisition process; and
generate the code by encoding the determined printed material ID,
wherein the shredder includes an input interface and configured to receive an input of a second user ID via the input interface,
wherein the shredder is configured to, in a case where the shredder successfully reads the code in the reading process, determine whether the first user ID matches the second user ID,
wherein the shredder is configured to, in a case where the first user ID matches the second user ID, execute the rewriting process and the shredding process, and
wherein the shredder is configured to, in a case where the first user ID does not match the second user ID, execute the discharge process without executing the rewriting process and the shredding process.

12. The printed material management system according to claim 10, wherein
the management program is configured to, in the generation process:
acquire a first printer ID;
determine the printed material ID including the acquired first printer ID for each page to be printed based on the print data acquired in the print data acquisition process; and
generate the code by encoding the determined printed material ID,
wherein the shredder includes an input interface and configured to receive an input of a second printer ID via the input interface,
wherein the shredder is configured to, in a case where the shredder successfully reads the code in the reading process, determine whether the first printer ID matches the second printer ID,
wherein the shredder is configured to, in a case where the first printer ID matches the second printer ID, execute the rewriting process and the shredding process, and
wherein the shredder is configured to, in a case where the first printer ID does not match the second printer ID, execute the discharge process without executing the rewriting process and the shredding process.

13. The printed material management system according claim 10,
wherein the device in which the management program is installed is an information processing device, and
wherein, in the print data acquisition process, the management program monitors a print queue of the information processing device and acquires the print data input to the print queue before the print data is output to the printer.

* * * * *